US011088954B2

(12) United States Patent
Li et al.

(10) Patent No.: US 11,088,954 B2
(45) Date of Patent: Aug. 10, 2021

(54) LINK DETECTION METHOD AND RELATED APPARATUS

(71) Applicant: HUAWEI TECHNOLOGIES CO., LTD., Shenzhen (CN)

(72) Inventors: Tong Li, Shenzhen (CN); Ke Xu, Beijing (CN); Jing Zuo, Shenzhen (CN); Fanzhao Wang, Shenzhen (CN); Kai Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/858,920

(22) Filed: Apr. 27, 2020

(65) Prior Publication Data
US 2020/0259748 A1  Aug. 13, 2020

Related U.S. Application Data

(63) Continuation of application No. PCT/CN2019/088143, filed on May 23, 2019.

(30) Foreign Application Priority Data

Jun. 4, 2018 (CN) .......................... 201810565684.8

(51) Int. Cl.
*H04L 12/803* (2013.01)
*H04L 12/707* (2013.01)
(Continued)

(52) U.S. Cl.
CPC ............ *H04L 47/125* (2013.01); *H04L 45/24* (2013.01); *H04L 45/38* (2013.01); *H04L 47/828* (2013.01)

(58) Field of Classification Search
CPC ..... H04L 47/125; H04L 45/24; H04L 47/828; H04L 47/12; H04L 45/125; H04L 43/0829
See application file for complete search history.

(56) References Cited

U.S. PATENT DOCUMENTS 8,539,094 B1 * 9/2013 Marr ..................... H04L 47/125
   709/235
8,745,264 B1 * 6/2014 Marr ..................... H04L 67/42
   709/235
(Continued)

FOREIGN PATENT DOCUMENTS

CN      101267450 A     9/2008
CN      102546286 A     7/2012
(Continued)

OTHER PUBLICATIONS

Honda, Michio, et al. "Multipath congestion control for shared bottleneck." Proc. PFLDNeT workshop. vol. 357. 2009.*
(Continued)

*Primary Examiner* — Jimmy H Tran
(74) *Attorney, Agent, or Firm* — Maier & Maier, PLLC

(57) ABSTRACT

A link detection technology. In a link detection method, when a target event occurs on paths, in a plurality of paths, whose quantity exceeds a preset quantity, whether the paths on which the target event occurs share a bottleneck link is detected, and congestion control is performed. It can be learned that in the technical solution provided in the embodiments of this application, the target event is a trigger, and shared bottleneck detection is performed after the quantity of the paths on which the target event occurs exceeds the preset quantity. This implements purposeful link detection, reduces system overheads, and brings a fast convergence speed.

9 Claims, 17 Drawing Sheets

(51) Int. Cl.
*H04L 12/721* (2013.01)
*H04L 12/911* (2013.01)

(56) References Cited

U.S. PATENT DOCUMENTS

| | | | | |
|---|---|---|---|---|
| 8,949,444 B1* | 2/2015 | Ma | ............ | H04L 47/27 709/228 |
| 2002/0161914 A1* | 10/2002 | Belenki | ............ | H04L 47/762 709/235 |
| 2004/0090916 A1* | 5/2004 | Hosein | ............ | H04L 47/824 370/235 |
| 2006/0092837 A1* | 5/2006 | Kwan | ............ | H04L 47/29 370/229 |
| 2007/0121505 A1* | 5/2007 | Ansari | ............ | H04L 47/2408 370/230 |
| 2007/0211633 A1* | 9/2007 | Gunawardena | ....... | H04L 47/245 370/232 |
| 2009/0022055 A1* | 1/2009 | Tan | ............ | H04L 47/10 370/238 |
| 2011/0013511 A1* | 1/2011 | Li | ............ | H04W 28/0242 370/231 |
| 2011/0116406 A1* | 5/2011 | Racz | ............ | H04L 47/14 370/252 |
| 2011/0235528 A1* | 9/2011 | Racz | ............ | H04W 28/10 370/244 |
| 2012/0300636 A1* | 11/2012 | Wang | ............ | H04L 47/17 370/235 |
| 2012/0320752 A1* | 12/2012 | Gouache | ............ | H04L 47/125 370/237 |
| 2013/0128735 A1* | 5/2013 | Li | ............ | H04L 47/25 370/230 |
| 2013/0258847 A1* | 10/2013 | Zhang | ............ | H04L 47/22 370/232 |
| 2014/0119184 A1* | 5/2014 | Harrang | ............ | H04L 12/28 370/235 |
| 2014/0160928 A1* | 6/2014 | Racz | ............ | H04W 28/0273 370/235 |
| 2014/0301225 A1* | 10/2014 | Palyi | ............ | H04L 47/11 370/252 |
| 2015/0073688 A1 | 3/2015 | Hampapur et al. | | |
| 2015/0117328 A1* | 4/2015 | Llairo | ............ | H04L 5/0044 370/329 |
| 2015/0172193 A1* | 6/2015 | Sinha | ............ | H04L 47/25 370/230 |
| 2015/0257162 A1* | 9/2015 | Reider | ............ | H04W 28/0242 370/230 |
| 2015/0295827 A1* | 10/2015 | Zhu | ............ | H04L 65/80 370/230 |
| 2015/0379301 A1 | 12/2015 | Lesavich et al. | | |
| 2016/0087898 A1* | 3/2016 | Ansari | ............ | H04L 47/11 370/235 |
| 2016/0149831 A1* | 5/2016 | Lu | ............ | H04L 47/788 370/229 |
| 2017/0085483 A1* | 3/2017 | Mihaly | ............ | H04L 47/24 |
| 2018/0309664 A1* | 10/2018 | Balasubramanian | ... | H04L 45/22 |
| 2019/0089613 A1* | 3/2019 | Hwang | ............ | H04L 47/196 |
| 2020/0014486 A1* | 1/2020 | Harrang | ............ | H04L 65/80 |

FOREIGN PATENT DOCUMENTS

| | | |
|---|---|---|
| CN | 103249086 A | 8/2013 |
| CN | 104170335 A | 11/2014 |
| CN | 104394202 A | 3/2015 |
| CN | 105827527 A | 8/2016 |

OTHER PUBLICATIONS

Ferlin, Simone, et al. "Revisiting congestion control for multipath TCP with shared bottleneck detection." IEEE INFOCOM 2016—The 35th Annual IEEE International Conference on Computer Communications. IEEE, 2016.*

Cao, Yu, Mingwei Xu, and Xiaoming Fu. "Delay-based congestion control for multipath TCP." 2012 20th IEEE international conference on network protocols (ICNP). IEEE, 2012.*

Winstein, Keith, and Hah Balakrishnan. "Tcp ex machina: Computer-generated congestion control." ACM SIGCOMM Computer Communication Review 43.4 (2013): 123-134.*

Raiciu, Costin, Mark Handley, and Damon Wischik. Coupled congestion control for multipath transport protocols. IETF RFC 6356, Oct. 2011.*

Han, Huaizhong, et al. "Multi-path tcp: a joint congestion control and routing scheme to exploit path diversity in the internet." IEEE/ACM Transactions on networking 14.6 (2006): 1260-1271.*

Cardwell, Neal, et al. "BBR: Congestion-Based Congestion Control: Measuring bottleneck bandwidth and round-trip propagation time." Queue 14.5 (2016): 20-53.*

Sergiou, Charalambos, Vasos Vassiliou, and Aristodemos Paphitis. "Congestion control in wireless sensor networks through dynamic alternative path selection." Computer Networks 75 (2014): 226-238.*

D. Hayes et al., "Shared Bottleneck Detection for Coupled Congestion Control for RTP Media", Internet Engineering Task Force (IETF), Request for Comments: 8382, Category: Experimental, Jun. 2018, total 25 pages.

Katabi et al., "A Passive Approach for Detecting Shared Bottlenecks", IEEE ICCCN, 2001, pp. 174-181.

Ferlin et al., "Revisiting Congestion Control for Multipath TCP with Shared Bottleneck Detection", IEEE INFOCOM 2016—The 35th Annual IEEE International Conference on Computer Communications, 2016, total 9 pages.

Hayes et al., "Practical Passive Shared Bottleneck Detection Using Shape Summary Statistics", 39th Annual IEEE Conference on Local Computer Networks, IEEE Local Computer Networks (LCN), 2014, pp. 150-158, Edmonton, Canada.

* cited by examiner

LINK DETECTION METHOD AND RELATED APPARATUS

CROSS-REFERENCE TO RELATED APPLICATIONS

This application is a continuation of International Application No. PCT/CN2019/088143, filed on May 23, 2019, which claims priority to Chinese Patent Application No. 201810565684.8, filed on Jun. 4, 2018. The disclosures of the aforementioned applications are hereby incorporated by reference in their entireties.

TECHNICAL FIELD

Embodiments relate to the field of communications, and more specifically, to a link detection technology.

BACKGROUND

At present, there are usually a plurality of paths from one host to another. Therefore, research on a multipath transmission technology becomes popular. For example, in a multipath transmission control protocol (MPTCP) technology, a plurality of paths are allowed to be used in one transmission control protocol (TCP) connection/session, to maximize channel resource utilization.

In reality, the plurality of paths may share a link. For example, referring to FIG. 1a, path 1 includes nodes A, B, D, and E, and path 2 includes nodes C, B, D, and F. Therefore, path 1 and path 2 share a link between B and D, that is, the link between B and D is a shared link of path 1 and path 2.

If a processing speed of the shared link is less than an arrival speed of a data packet, a queuing phenomenon (causing congestion) occurs on the shared link. In this case, the shared link becomes a bottleneck link. That is, in a data transmission process, a throughput of each of the plurality of paths that share the bottleneck link is limited by the bottleneck link, and a throughput change of one of the paths affects a throughput of another path that shares the bottleneck link. If two paths do not share a bottleneck link, a throughput change of one path does not affect a throughput of the other path.

A congestion control manner of a plurality of paths that share a bottleneck link should be different from that of paths that do not share a bottleneck link, and how to detect whether paths share a bottleneck link is a prerequisite for congestion control.

SUMMARY

To resolve the foregoing problem, embodiments provide a link detection method and a related apparatus, to provide a solution for detecting whether paths share a bottleneck link.

To achieve the foregoing objective, embodiments of this application provide the following technical solutions.

According to one aspect, an embodiment provides a link detection method. In this method, when a target event occurs on paths, in a plurality of paths, whose quantity exceeds a preset quantity, whether the paths on which the target event occurs share a bottleneck link is detected, and congestion control is performed. In other words, in the technical solution provided in an embodiment, the target event is a trigger, and shared bottleneck detection is performed after the quantity of the paths on which the target event occurs exceeds the preset quantity. This implements purposeful link detection, reduces system overheads, and brings a fast convergence speed.

In an embodiment, when the target event occurs on the paths, in the plurality of paths, whose quantity exceeds the preset quantity, a sum of information entropies of a plurality of groups in a first set is compared with a sum of an information entropy of a first group and information entropies of a plurality of second groups in a second set. Congestion control may include: when the sum of the information entropies of the plurality of groups in the first set is greater than the sum of the information entropy of the first group and the information entropies of the plurality of second groups in the second set, performing congestion control on paths of the first group in a shared link congestion control manner. In another embodiment, when the sum of the information entropies of the plurality of groups in the first set is less than the sum of the information entropy of the first group and the information entropies of the plurality of second groups in the second set, congestion control is performed, in the shared link congestion control manner, on paths in a group that is in the first set and that includes two or more paths. In other words, the one that has a smaller sum of information entropies in the first set and the second set is closer to a case in which paths share a bottleneck link in a real situation. In this case, congestion control is performed on groups in the set that has the smaller sum of information entropies. It can be learned that, in this embodiment, the set that has the smaller sum of information entropies is selected, and a congestion control manner is adaptively selected for the set that has the smaller sum of information entropies, thereby achieving both performance and fairness objectives.

In addition, in another embodiment, after the first group is obtained, whether the paths in the first group share a bottleneck link may be directly determined. If the paths in the first group share a bottleneck link, congestion control is performed on the paths in the first group in the shared link congestion control manner. If the paths in the first group do not share a bottleneck link, congestion control is performed, in the shared link congestion control manner, on paths in a group that is in the first set and that includes two or more paths.

In an embodiment, if all paths in the first group have same source IP addresses and destination IP addresses, in this case, it may be directly determined that all the paths in the first group share a bottleneck link, then the information entropies may not be calculated subsequently, and congestion control is performed directly on the paths of the first group in the shared link congestion control manner.

In an embodiment, before "the sum of the information entropies of the plurality of groups in the first set is compared with the sum of the information entropy of the first group and the information entropies of the plurality of the second groups in the second set", a quantity of paths on which the target event occurs may be first detected, where the preset quantity is two or more. It can be learned that, in this embodiment, detection is performed at two layers. First-layer detection is pre-detection performed after the target event occurs (pre-detection includes detection of a quantity of packet loss paths within preset duration). If it is determined (at least based on the quantity of the paths on which the target event occurs) that further detection is required after pre-detection, shared bottleneck detection (namely, second-layer detection) is performed. This further reduces unnecessary calculation and detection overheads.

In an embodiment, the target event may be a sudden change event. For example, the sudden change event may include a packet loss event, and a sudden change of an arrival time interval of a data packet. The sudden change may include the following: A time difference between an arrival time interval of a data packet in a current time period (the period is usually very short) and an arrival time interval in a previous time period is greater than a preset time difference threshold. For example, an average value or a median of arrival time intervals of data packets in the previous period is 2 ms, an average value or a median of arrival time intervals of data packets in the current period is 10 ms, the time difference is 8 ms, and the preset time difference threshold is 1 ms. In this case, it may be determined that the arrival time intervals of the data packets encounter a sudden change. It should be noted that before the technical solution in embodiments of the invention is proposed, a packet loss event is usually used as a network congestion signal. However, in this embodiment of this application, the packet loss event is used as a basis for determining a shared bottleneck link (instead of a congestion signal), thereby breaking the routine. This solution is more accurate than a conventional periodic detection solution, and reduces unnecessary detection overheads. In addition, system overheads are low, a convergence speed is fast, and no complex calculation is required (low calculation complexity).

In an embodiment, the plurality of paths separately belong to the plurality of groups in the first set, and the plurality of paths also separately belong to the plurality of groups in the second set. The second set includes one first group and the plurality of second groups, the first group includes all the paths on which the target event occurs, and compared with the plurality of groups in the first set, the plurality of second groups in the second set do not have the paths on which the target event occurs. In an embodiment, before the target event occurs, the paths separately belong to the plurality of groups in the first set, and each group includes at least one path. After pre-detection ends (or the quantity of the paths on which the target event occurs exceeds the preset quantity), the plurality of paths separately belong to the plurality of groups in the second set. It should be noted that the first set may be a set obtained after previous link detection. There may also be a case in which no link detection is performed. Actually, after a path is registered (path registration is described subsequently in this specification), the path is classified into an independent group. For example, path 1 to path 3 are registered, and path 1 to path 3 are classified into three independent groups. Each group includes one path. Therefore, even if link detection is not performed, the path also has a home group. For example, the target event is a packet loss event, and a path on which the target event occurs is a packet loss path. A group that is in the first set and to which a packet loss path belongs before the packet loss path is added to the first group may be referred to as "a group in which a packet loss event occurs". After pre-detection ends, "the group in which the packet loss event occurs" becomes the second group after the packet loss path is removed. For example, there are path A to path E. Before the packet loss event occurs, path A and path B belong to group g1, path C and path D belong to group g2, and path E belongs to group g3. Assuming that the packet loss event occurs on both path A and path C, path A is removed from group g1, path C is removed from group g2, and path A and path C are placed in the first group. In this way, original group g1 becomes second group G1, and second group G1 includes path B. Original group g2 becomes second group G2, and second group G2 includes path D. The first group includes path A and path C. No packet loss occurs on a path in group g3. The second set includes second group G1, second group G2, a new group, and group g3. The second set is a set obtained by removing a packet loss path from an original group and adding the packet loss path to the first group. It should be noted that different groups do not share a bottleneck link.

In an embodiment, the following congestion control may be performed. For a group that is in the set with the smaller sum of information entropies and that includes a plurality of paths, congestion control is performed in a first congestion control manner. For a group that is in the set with the smaller sum of information entropies and that includes one path, congestion control is performed in a second congestion control manner. Because a plurality of paths belonging to a same group share a bottleneck link, the first congestion control manner includes a congestion control manner for paths sharing a bottleneck link. However, for a group including one path, because the path and another path do not share a bottleneck link, the second congestion control manner may be used. Optionally, an economic factor may be further added to selection of a congestion control manner to further ensure fairness. For example, if a plurality of paths in a group access different network service providers, because the different service providers share a bottleneck link less likely, the second congestion control manner may also be selected for the paths in the group.

In an embodiment, before congestion control is performed on the paths of the first group in the shared link congestion control manner, congestion control is performed on one or more paths in the first group in a single-path congestion control manner.

In an embodiment, "the quantity of the paths on which the target event occurs" may be "a quantity of paths on which the target event occurs within preset duration", and "an identifier of the path on which the target event occurs" may be "an identifier of the path on which the target event occurs within the preset duration". A person of ordinary skill in the art may flexibly design a length of the preset duration, for example, the preset duration may be designed as 10 round trip time (RTT) periods. In an embodiment, when the target event is detected for the first time, a timer may be started to perform countdown, and timing duration of the timer is the preset duration. It should be noted that, when the target event is detected again, if the timer is already started and does not time out, the timer is not reset again.

According to another aspect, an embodiment of the present disclosure provides a link detection device. The link detection device has a function of implementing behavior of the link detection device in the foregoing method implementation. The function may be implemented by using hardware, or implemented by hardware executing corresponding software. The hardware or the software includes one or more modules corresponding to the foregoing function.

In an embodiment, a structure of the link detection device includes: a processor and a memory, where the processor performs, by running a software program stored in the memory and invoking data stored in the memory, the method performed by the link detection device.

According to another aspect, an embodiment provides a computer-readable storage medium, and the computer-readable storage medium stores an instruction. When the instruction is run on a computer, the computer is enabled to perform the method in the foregoing aspect.

According to another aspect, this application provides a computer program product that includes an instruction, and when the instruction is run on a computer, the computer is enabled to perform the method in the foregoing aspect.

According to another aspect, an embodiment provides a chip system, and the chip system includes a processor, configured to support a link detection device in implementing functions in the foregoing aspects, for example, generating or processing data and/or information in the foregoing method. In an embodiment, the chip system further includes a memory, and the memory is configured to store a program instruction and data that are utilized for the link detection device. The chip system may include a chip, or may include a chip and another discrete device.

It can be learned that, in the solution provided in the embodiments, when the target event occurs on the paths, in the plurality of paths, whose quantity exceeds the preset quantity, whether the paths on which the target event occurs share a bottleneck link is detected, and congestion control is performed. In other words, in the technical solution provided in an embodiment, the target event is a trigger, and shared bottleneck detection is performed after the quantity of the paths on which the target event occurs exceeds the preset quantity. This implements purposeful link detection, reduces system overheads, and brings a fast convergence speed.

DETAILED DESCRIPTION OF EMBODIMENTS

Embodiments of this application provide a link detection method and a related apparatus (a detection apparatus, a detection device, a storage medium, and the like).

The detection method and the related apparatus provided in the embodiments of this application may be applied to all scenarios that are based on a TCP protocol and in which shared bottleneck link detection needs to be performed, to detect whether a plurality of data flows share a bottleneck link. The foregoing "a plurality of data flows" may be conventional TCP data flows, or may be a plurality of MPTCP subflows.

The following first briefly describes an MPTCP technology.

With rapid development of the Internet, intelligent devices are growing explosively, including emerging intelligent devices such as a smartphone, a tablet computer, a smartwatch, and a smart television, and conventional electronic devices such as a conventional notebook computer, and have become an indispensable part of people's life.

Most intelligent devices support a plurality of access modes. For example, usually a Wi-Fi interface, a mobile network interface, a Bluetooth interface, and the like are configured for the smartphone.

Although many devices have a plurality of network interfaces, a conventional TCP is still a single-line protocol. In a TCP communication process, neither a transmit end nor a receive end can randomly change an address. For example, if a user selects Wi-Fi to access a network, in an entire transmission process, data transmission can be completed in a Wi-Fi environment. If the Wi-Fi environment changes in the transmission process, and performance of the Wi-Fi environment deteriorates, the user abandons the transmission, and chooses another access mode to restart the transmission, or tolerates the change of the Wi-Fi environment until the transmission ends, and cannot use a mobile network to continue data transmission when the Wi-Fi environment deteriorates.

Figure 1A:
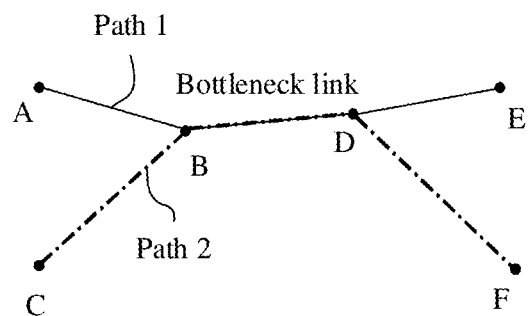
FIG. 1a is a schematic diagram in which paths share a link according to an embodiment.
Figure 1B:
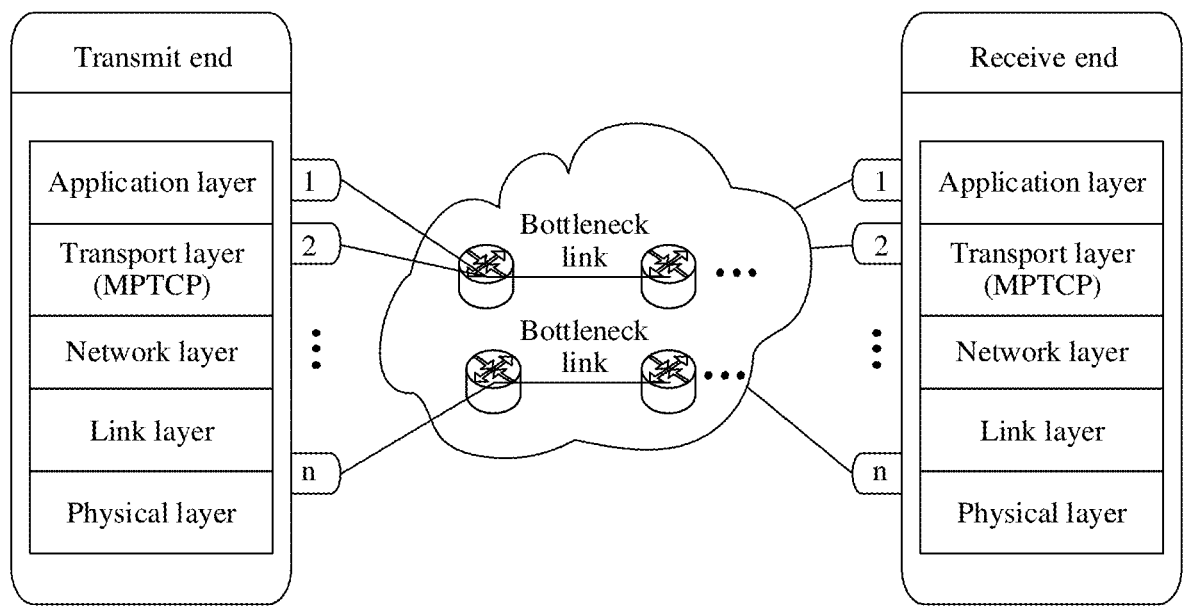
FIG. 1b is a schematic diagram of an MPTCP connection according to an embodiment.

The MPTCP technology allows data to be transmitted through a plurality of subflows during one connection. Referring to FIG. 1b, when two hosts communicate with each other by using an MPTCP, n subflows are simultaneously enabled. The subflow is a separate TCP connection, and a start and an end of the subflow are the same as those of a conventional TCP connection. The n subflows form one MPTCP connection.

That is, one MPTCP session between a transmit end and a receive end includes n subflows, and n is a quantity of paths between the transmit end and the receive end.

It should be noted that, in the MPTCP technology, a plurality of paths are established between the transmit end and the receive end for one TCP connection, and a data flow transmitted on the path is a subflow.

In an embodiment, one subflow may be established in a three-way handshake manner, and released in a four-way handshake manner. All these subflows are bound to the MPTCP session, and one of the subflows may be selected to transmit data on the transmit end.

Compared with the conventional TCP, the MPTCP provides more choices for transmission: One of the paths is used as a primary path, and the other paths are used as secondary paths. Compared with single-path transmission, an advantage of multipath is that when performance of the primary path deteriorates, a new path may be selected as the primary path, and traffic is transferred to the new primary path, thereby ensuring that transmission efficiency does not decrease due to performance deterioration of one path.

For example, the primary path may be a Wi-Fi network, and the secondary path may be a mobile network. If a Wi-Fi environment deteriorates in a transmission process, the mobile network may be further selected as the primary path to continue data transmission.

A linked increment algorithm (LIA), namely, a congestion control manner, is used by each of the subflows by default, to ensure fairness between the MPTCP and the conventional TCP. A difference between the LIA and a congestion control manner used in conventional single-path TCP transmission is that performance and fairness constraints are added in the LIA. Based on the LIA, a packet-loss-based congestion control manner emerges in subsequent optimization, for example, an opportunistic linked-increases algorithm (OLIA) and a balanced linked adaptation (BALIA) algorithm, and a latency-based congestion control manner, for example, a weighted Vegas algorithm.

In the congestion control manners such as the LIA, the OLIA, and the BALIA, it is assumed that all paths share a same bottleneck link. In this application, the congestion control manners for the shared bottleneck link are collectively referred to as a coupled congestion control manner (which may be referred to as a first congestion control manner). A congestion control manner used in the conventional single-path TCP transmission is collectively referred to as an uncoupled congestion control manner (which may be referred to as a second congestion control manner).

The LIA is used as an example, and a congestion window (cwnd) of an MPTCP data flow needs to meet two conditions: (1) A sum of throughputs of a universal set of sub-paths is not less than a throughput of an optimal single-path. (2) A sum of throughputs of any sub-path proper set is not greater than a throughput of an optimal single-path of these sub-paths. A convergence result of this algorithm is that a throughput rate of the MPTCP is slightly greater than a throughput rate of the optimal single-path.

Actually, subflows do not necessarily share a same bottleneck link. In this case, the fairness constraint may cause unfairness instead. Naturally, if a high throughput needs to be obtained and fairness needs to be ensured, shared bottleneck link detection needs to be performed, and a congestion control manner of each subflow is precisely controlled and selected based on a detection result.

A principle of an existing shared bottleneck link detection manner is as follows:

Because a processing speed of a bottleneck link is not greater than an arrival speed of a packet (or a data packet) (otherwise, the bottleneck link is not formed), a queuing phenomenon appears on the bottleneck link. Due to existence of the queuing phenomenon, arrival time intervals of packets are distributed more evenly.

In other words, if two paths share a bottleneck link, packets transmitted on the two paths are sorted based on arrival time, and then an arrival time difference between two adjacent packets is calculated. If time differences calculated by combining arrival time of the two paths are distributed more evenly than those before the combination, it is considered that the two paths more likely share a bottleneck link. By using this characteristic, it can be determined whether two paths share a same bottleneck link.

That is, (1) Packets that pass through a same bottleneck link have regular arrival time intervals; and (2) Packets that pass through different bottleneck links have random arrival time intervals.

An information entropy may represent distribution convergence and divergence of numerical values. In other words, if the numerical values are concentrated on a plurality of values, in this case, information entropies of the numerical values are less than information entropies of numerical values distributed more dispersedly. By using a characteristic of the information entropy, a minimized information entropy may be obtained as a target, and paths that share a bottleneck link are obtained through iterative classification.

Figure 1C:
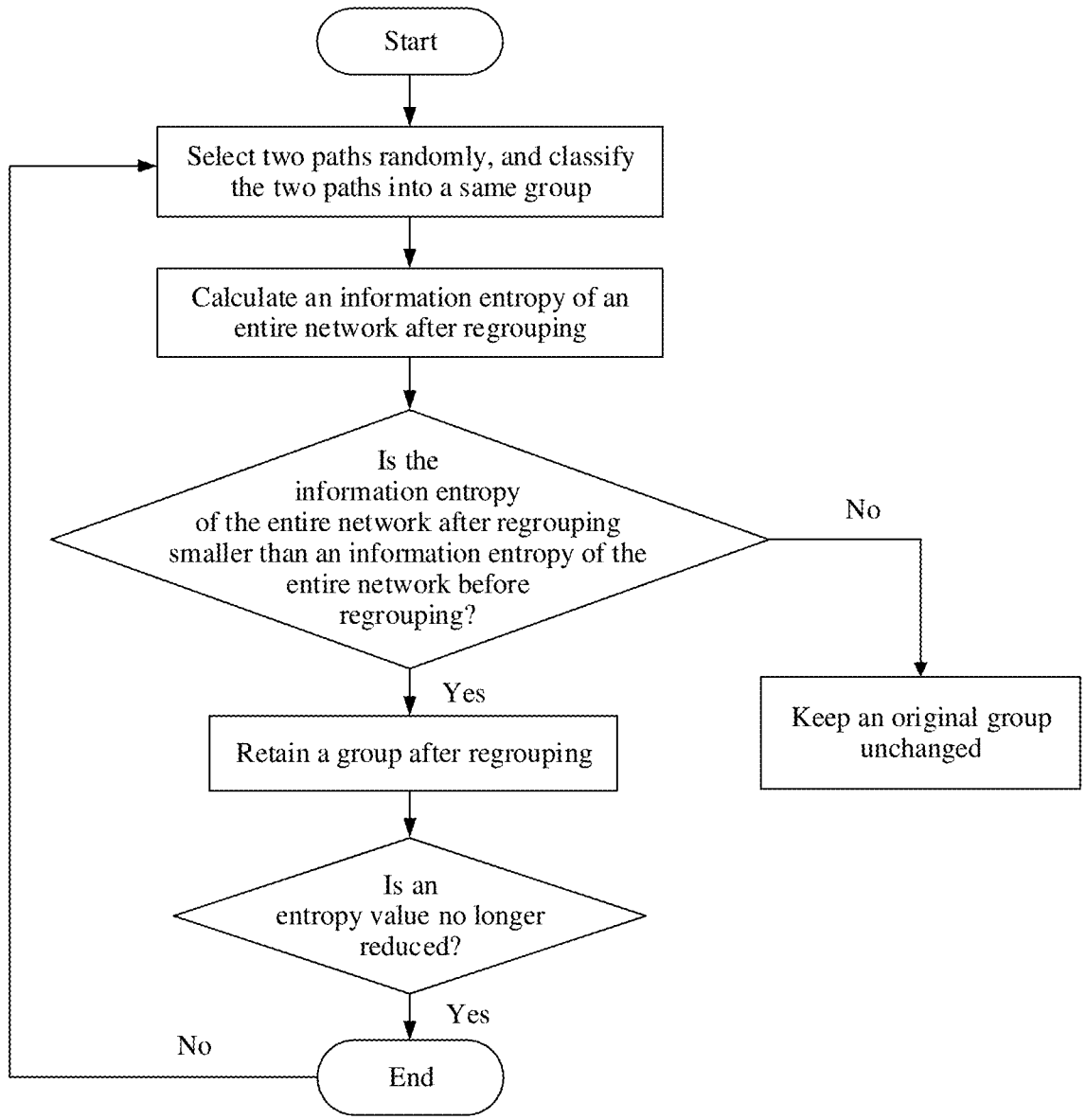
FIG. 1c is an example flowchart of existing link detection according to an embodiment.

Referring to FIG. 1c, detecting a shared bottleneck link based on an information entropy of an arrival time interval may include the following steps.

Step 1: Select two paths randomly, and classify the two paths into a same group (other paths remain unchanged in an original group).

Step 2: Calculate an information entropy of an entire network after regrouping, where the information entropy of the entire network herein refers to a sum of information entropies of all groups.

Step 3: If the information entropy of the entire network after regrouping is less than an information entropy of the entire network before regrouping, this group (the group after regrouping) is retained. Otherwise, keep the original group unchanged.

The foregoing process continues until the information entropy of the entire network is no longer reduced.

Disadvantages of the foregoing process are as follows:

(1) Overhead aspect: Because time for shared bottleneck link detection cannot be decided, detection can be performed periodically. Therefore, the solution is strongly dependent on a detection period. If the period is excessively long, the solution cannot adapt to dynamic network changes. If the period is excessively short, system overheads are high.

(2) Convergence aspect: Two paths are randomly selected each time for determining, resulting in a low convergence speed. In extreme cases, a jitter occurs, and convergence cannot be implemented.

Different from the foregoing existing manner, in a technical solution provided in an embodiment, when a target event occurs on paths, in a plurality of paths, whose quantity exceeds a preset quantity, whether the paths on which the target event occurs share a bottleneck link is detected (link detection for short), to obtain a detection result.

The preset quantity may be 2 or another natural number greater than 2.

The following describes example structures of a detection apparatus and a detection device of an embodiment.

The detection device may be a terminal device, a server, or the like that provides voice and/or data connectivity for a user, or may be an extension of an intermediate device or a network element in a network, for example, a gateway, an access router, a core router, a front-end router, or a load balancer.

The terminal may include a wired terminal and a wireless terminal. The wireless terminal may be a handheld device having a wireless connection function, or another processing device connected to a wireless modem. For example, the wireless terminal may be a mobile telephone, a mobile phone, a computer, a tablet computer, a personal digital assistant (PDA), a mobile Internet device (MID), a wearable device, or an e-book reader. For another example, the wireless terminal may alternatively be a portable, pocket-sized, handheld, computer built-in, or in-vehicle mobile device.

Figure 1D:
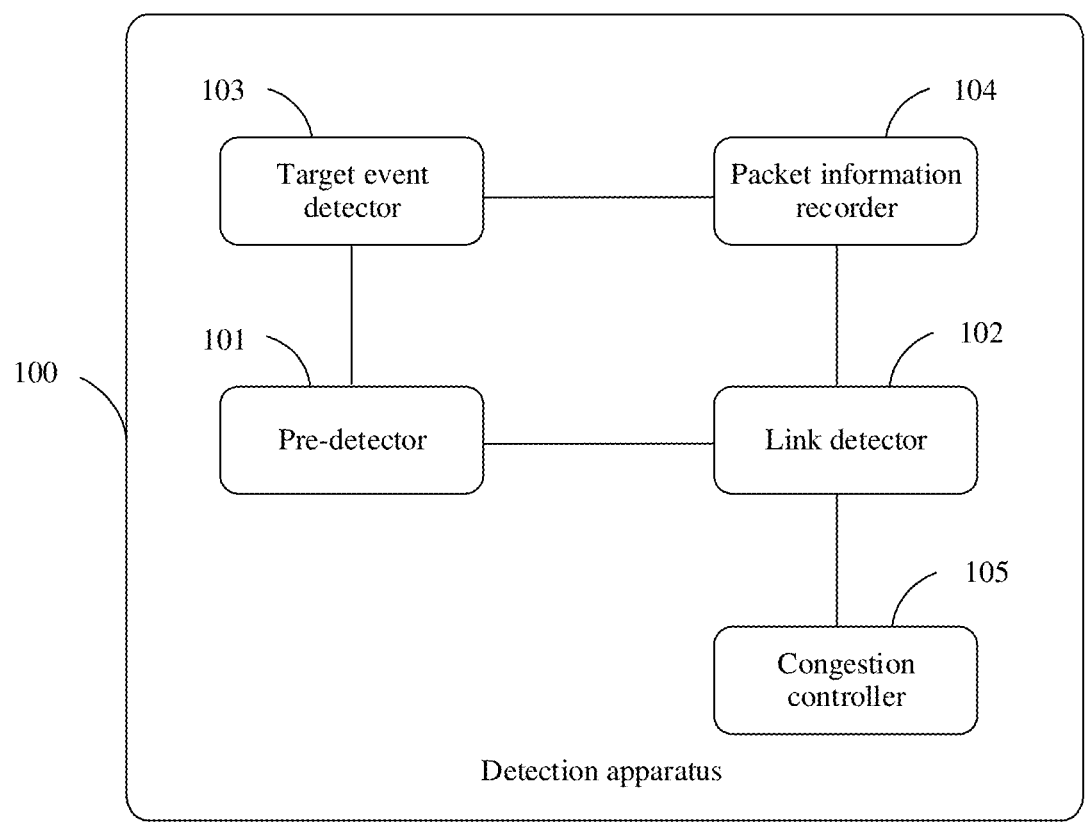
FIG. 1d is an example structural diagram of a detection apparatus according to an embodiment.

Referring to FIG. 1*d*, the detection apparatus 100 may include at least a link detector 102 (configured to perform link detection), a target event detector 103 (configured to detect a target event), and a congestion controller 105. Furthermore, in another embodiment, the detection apparatus 100 may further include at least one of a pre-detector 101 and a packet information recorder 104. A function of each unit is subsequently described in combination with embodiments.

The packet information recorder 104, the pre-detector 101, and the link detector 102 are newly added units.

The detection apparatus 100 may be applied to the detection device in a form of software or hardware. FIG. 1*b* shows an example scenario of the detection apparatus. One of two hosts is used as a transmit end, and the other is used as a receive end, so as to perform MPTCP communication. There are n subflows between the two hosts. The host used as the transmit end includes the detection apparatus. Because the host not only sends data but also receives data, the receive end in FIG. 1*b* may also include the detection apparatus.

When the detection apparatus is applied to the detection device in a form of software, in an example, the detection apparatus may be independent software, for example, an application deployed in a mobile terminal, or may be an operating system or an operating system level program of the mobile terminal.

Figure 1E:
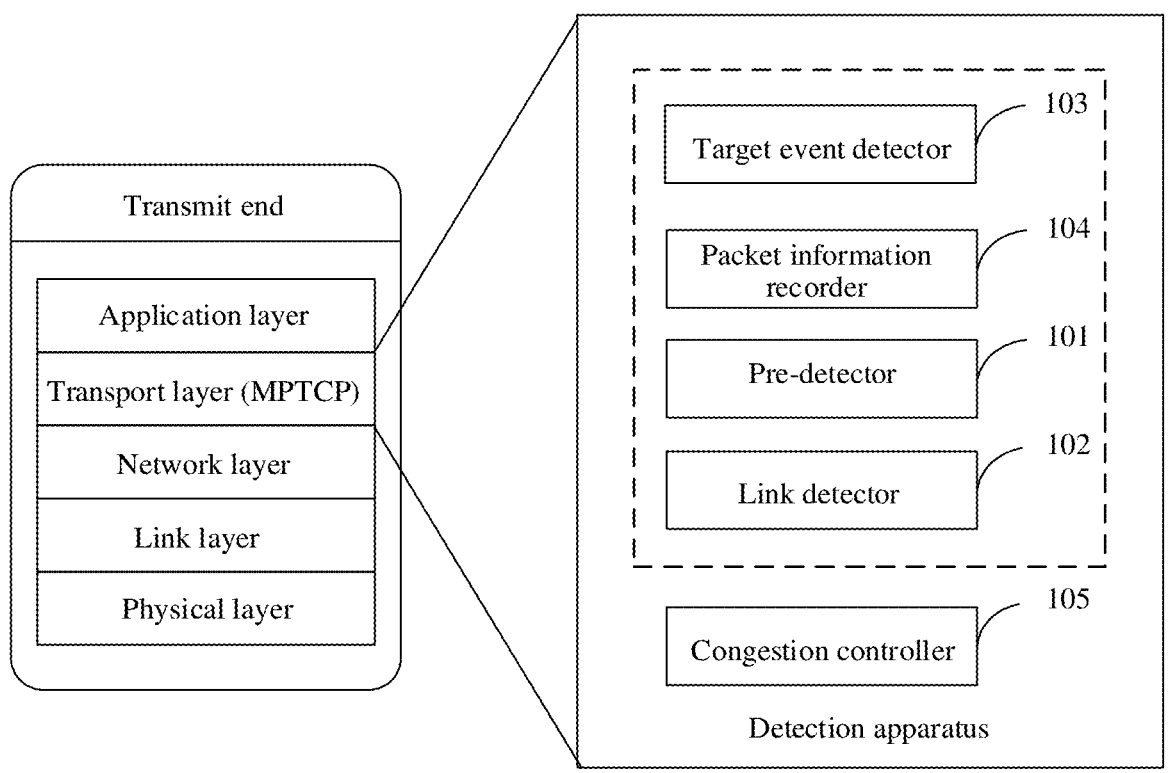
FIG. 1e is an example structural diagrams of a detection apparatus according to an embodiment.

In another example, referring to FIG. 1*e*, each unit in the detection apparatus 100 may be a function module added to a transport layer in a kernel protocol stack. Alternatively, each unit in the detection apparatus 100 may be a function module added to a transport layer in a user mode protocol stack.

Figure 2:
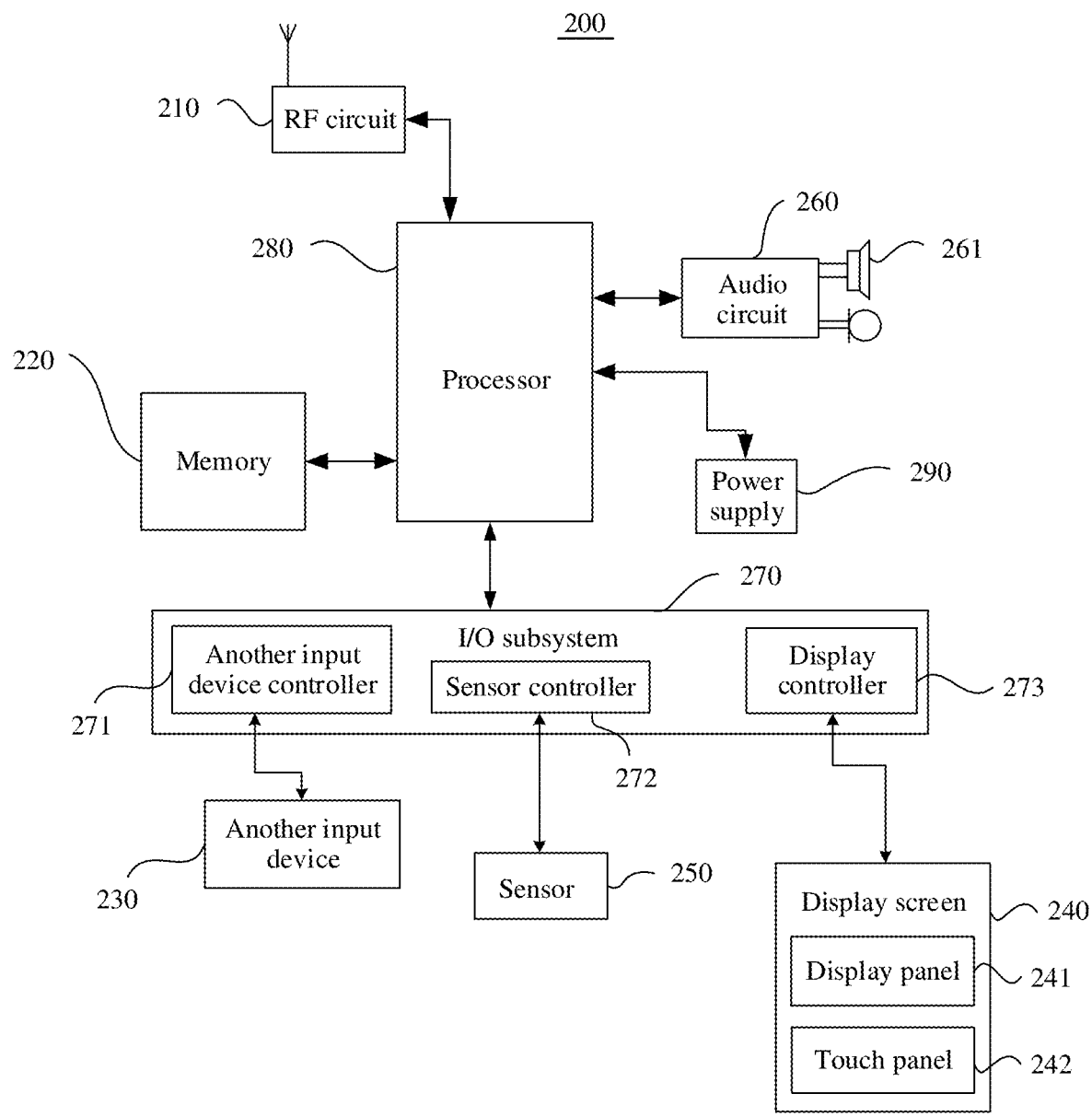
FIG. 2 is an example structural diagram of a detection device according to an embodiment.

FIG. 2 is a schematic structural diagram of a detection device 200 related to an embodiment. Referring to FIG. 2, the detection device 200 includes components such as an RF (Radio Frequency) circuit 210, a memory 220, another input device 230, a display screen 240, a sensor 250, an audio circuit 260, an I/O subsystem 270, a processor 280, and a power supply 290. A person of ordinary skill in the art may understand that a structure of the detection device 200 shown in FIG. 2 constitutes no limitation on the detection device, and the detection device may include more or fewer parts than those shown in the figure, or combine some parts, or split some parts, or have different part arrangements. A person of ordinary skill in the art may understand that the display screen 240 belongs to a user interface, and the detection device 200 may include more or fewer user interfaces than those shown in the figure.

The following describes each constituent component of the detection device 200 with reference to FIG. 2.

The RF circuit 210 may be configured to send and receive a signal in an information sending and receiving process or a call process. Particularly, the RF circuit 210 receives downlink information from a base station, and then delivers the downlink information to the processor 280 for processing. In addition, the RF circuit 210 sends uplink data to the base station. The RF circuit usually includes but is not limited to an antenna, at least one amplifier, a transceiver, a coupler, a low noise amplifier (LNA), a duplexer, and the like. In addition, the RF circuit 210 may further communicate with a network and another device through wireless communication. Any communications standard or protocol may be used for the wireless communication, and includes but is not limited to a global system for mobile communications (GSM), a general packet radio service (GPRS), a code division multiple access (CDMA), a wideband code division multiple access (WCDMA), long term evolution (LTE), an email, a short message service (SMS), a 5G access network technology (NR), and the like.

The memory 220 may be configured to store a software program and a module. The processor 280 executes various function applications of the detection device 200 and data processing by running the software program and the module that are stored in the memory 220. The memory 220 may mainly include a program storage area and a data storage area. The program storage area may store an operating system, an application program required by at least one function (such as a sound playing function or an image playing function), and the like. The data storage area may store data (such as audio data or an address book) created based on use of the detection device 200, and the like.

In addition, the memory 220 may include a high speed random access memory, and may further include a nonvolatile memory, such as at least one magnetic disk storage device, a flash memory, or another volatile solid-state storage device.

The another input device 230 may be configured to receive input digit or character information, and generate a key signal input related to user setting and function control of the detection device 200.

In an embodiment, the another input device 230 may include but is not limited to: one or more of a physical keyboard, a function key (such as a volume control key or an on/off key), a trackball, a mouse, a joystick, an optical mouse (the optical mouse is a touch-sensitive surface that does not display visual output, or an extension of a touch-sensitive surface formed by a touchscreen), and the like. The another input device 230 is connected to another input device controller 271 of the I/O subsystem 270, and exchanges a signal with the processor 280 under control of the another input device controller 271.

The display screen 240 may be configured to display information entered by a user or information provided to a user, and various menus of the detection device 200, and may further receive a user input. In an embodiment, the display screen 240 may include a display panel 241 and a touch panel 242. The display panel 241 may be configured by using a liquid crystal display (LCD), an organic light-emitting diode (OLED), or the like. The touch panel 242 is also referred to as a touchscreen, a touch-sensitive screen, or the like, and may collect a contact or non-contact operation of the user on or near the touch panel 242 (such as an operation of the user on or near the touch panel 242 by using any suitable object or attachment such as a finger or a stylus, or a motion sensing operation, where the operation includes a single-point control operation, a multi-point control operation, and another type of operation), and drive a corresponding connection apparatus based on a preset program.

Optionally, the touch panel 242 may include two parts: a touch detection apparatus and a touch controller. The touch detection apparatus detects a touch orientation and gesture of the user, detects a signal brought by the touch operation, and sends the signal to the touch controller. The touch controller receives touch information from the touch detection apparatus, converts the touch information into information that can be processed by the processor, then sends the information to the processor 280, and can receive and execute a command sent by the processor 280. In addition, the touch panel 242 may be implemented by using a plurality of types such as a resistive type, a capacitive type, an infrared ray, and a surface acoustic wave, or the touch panel 242 may be implemented by using any technology developed in the future.

Further, the touch panel 142 may cover the display panel 241. The user may perform, based on content (the displayed content includes but is not limited to a soft keyboard, a virtual mouse, a virtual key, an icon, and the like) displayed on the display panel 241, an operation on or near the touch panel 242 covering the display panel 241. After detecting the operation on or near the touch panel 242, the touch panel 242 transfers the operation to the processor 280 by using the I/O subsystem 270, to determine the user input. Subsequently, the processor 280 provides a corresponding visual output on the display panel 241 by using the I/O subsystem 270 based on the user input. In FIG. 2, the touch panel 242 and the display panel 241 are used as two independent parts to implement input and output functions of the detection device 200. However, in some embodiments, the touch panel 242 and the display panel 241 can be integrated to implement the input and output functions of the detection device 200.

The detection device 200 may further include at least one sensor 250, such as a light sensor, a motion sensor, and another sensor. In an embodiment, the light sensor may include an ambient light sensor and a proximity sensor. The ambient light sensor may adjust luminance of the display panel 241 based on brightness of ambient light. The proximity sensor may turn off the display panel 241 and/or backlight when the detection device 200 moves to an ear. As a type of motion sensor, an accelerometer sensor can detect a value of an acceleration in each direction (generally three axes), and detect a value and a direction of gravity when the accelerometer sensor is static, and is applicable to an application for recognizing a detection device posture (for example, switching between a landscape screen and a portrait screen, related games, and magnetometer posture calibration), a function related to vibration recognition (such as a pedometer or a knock), and the like. Other sensors such as a gyroscope, a barometer, a hygrometer, a thermometer, and an infrared sensor may also be disposed on the detection device 200. Details are not described herein for the sake of brevity.

The audio circuit 260, a speaker 261, and a microphone 262 may provide audio interfaces between the user and the detection device 200. The audio circuit 260 may convert received audio data into a signal and transmit the signal to the speaker 261. The speaker 261 converts the signal into a sound signal for output. In addition, the microphone 262 converts a collected sound signal into a signal. The audio circuit 260 receives the signal and converts the signal into audio data, and outputs the audio data to the RF circuit 210 to send the audio data to another device, or outputs the audio data to the memory 220 for further processing.

The I/O subsystem 270 is configured to control an external input/output device, and may include the another input device controller 271, a sensor controller 272, and a display controller 273.

Optionally, one or more other input controller device input controllers 271 receive a signal from the another input device 230 and/or send a signal to the another input device 230.

The another input device 230 may include a physical button (a press button, a rocker button, or the like), a dial, a slide switch, a joystick, a click roller, and an optical mouse (the optical mouse is a touch-sensitive surface that does not display a visual output, or an extension of a touch-sensitive surface formed by a touchscreen).

It should be noted that the another input device controller 271 may be connected to any one or more of the foregoing devices.

The display controller 273 in the I/O subsystem 270 receives a signal from the display screen 240 and/or sends a signal to the display screen 240. After the display screen 240 detects a user input, the display controller 273 converts the detected user input into interaction with a user interface object displayed on the display screen 240, to implement human-computer interaction. The sensor controller 272 may receive and/or send a signal from/to one or more sensors 250.

The processor 280 is a control center of the detection device 200, connects parts of the entire detection device by using various interfaces and lines, and runs or executes the software program and/or the module stored in the memory 220 and invokes the data stored in the memory 220, to perform various functions of the detection device 200 and process data, and perform overall monitoring on the detection device. Optionally, the processor 280 may include one or more processing units. Preferably, an application processor and a modem processor may be integrated into the processor 280. The application processor mainly processes an operating system, a user interface, an application, and the like. The modem processor mainly processes wireless communication. It may be understood that the modem processor may alternatively not be integrated into the processor 280.

The detection device 200 further includes the power supply 290 (such as a battery) supplying power to the components. Preferably, the power supply may be logically connected to the processor 280 by using a power management system, to implement functions such as management of charging, discharging, and energy consumption by using the power management system.

Although not shown in the figure, the detection device 200 may further include a camera, a Bluetooth module, and the like. Details are not described herein for the sake of brevity.

The processor 280 executes the program stored in the memory 220 and invokes another device, to enable the detection device to perform a link detection method provided in the following embodiment.

A detection method provided in an embodiment may be performed once at the beginning of running, and no longer changes after running, or may be driven by the target event, and dynamically adapts to a network change. The target event may be a sudden change event. For example, the sudden change event may include a packet loss event, and a sudden change of an arrival time interval of a data packet.

The sudden change may include the following: A time difference between an arrival time interval of a data packet in a current time period (the period is usually very short) and an arrival time interval in a previous time period is greater than a preset time difference threshold. For example, an average value or a median of arrival time intervals of data packets in the previous period is 2 ms, an average value or a median of arrival time intervals of data packets in the current period is 10 ms, the time difference is 8 ms, and the preset time difference threshold is 1 ms. In this case, it may be determined that the arrival time intervals of the data packets encounter a sudden change.

The link detection method provided in an embodiment is described below by using an example in which the target event is a packet loss event.

Figure 3:
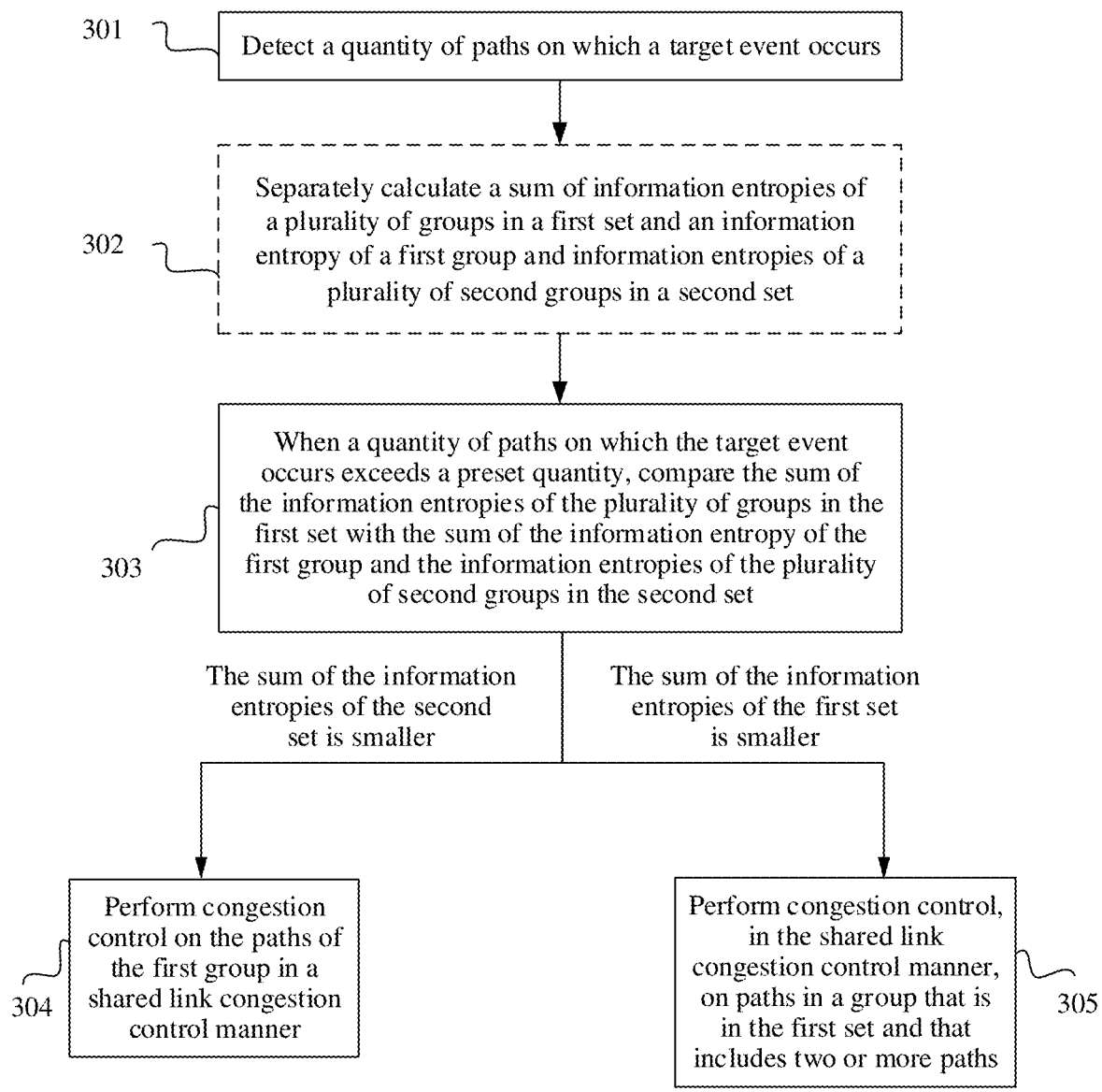
FIG. 3 is an example procedure of a link detection method according to an embodiment.
Figure 4A:
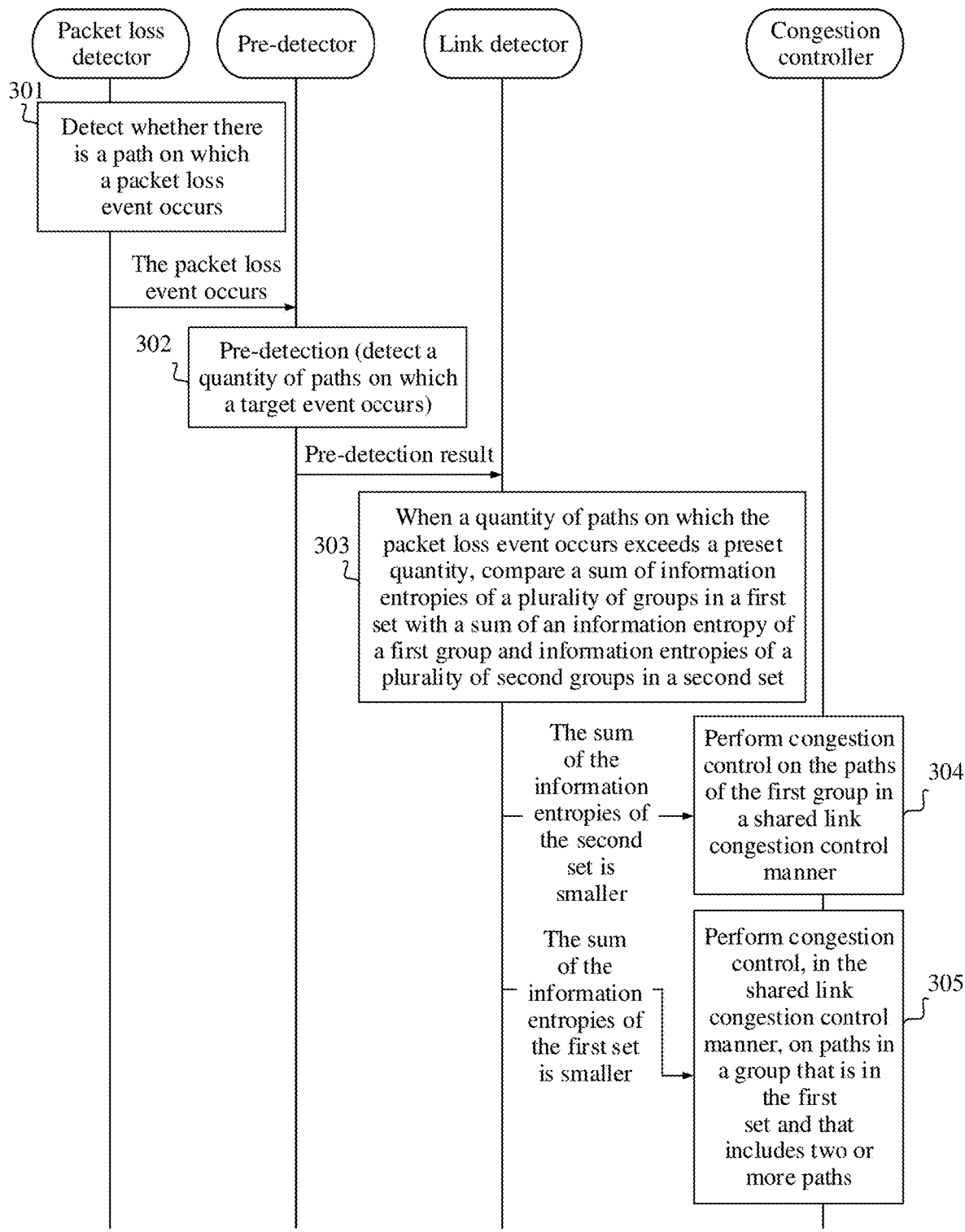
FIG. 4a is an example procedure of a link detection method according to an embodiment.

FIG. 3 and FIG. 4a show an example interaction procedure of the foregoing detection method. The detection procedure may be applied to the foregoing mentioned scenario in which shared bottleneck link detection needs to be performed, for example, the scenario in which the MPTCP is used shown in FIG. 1b.

The foregoing interaction procedure includes at least the following steps.

S301. A detection apparatus detects or counts a quantity of paths on which a target event (a packet loss event) occurs.

A detection device in which the detection apparatus is located may be a start point or an end point of a path (that is, the detection device is a sender or a receiver of a data packet/packet). Alternatively, a detection device in which the detection apparatus is located is a node in a path (that is, the detection device is a node through which a data packet/packet passes).

In an example, part 301 may be performed by the target event detector 103.

In an embodiment, the target event detector 103 may detect whether there is a path on which the packet loss event occurs, and may send a pre-detection request to the pre-detector 101 after detecting the packet loss event, and the pre-detector 101 counts a quantity of paths on which the target event occurs.

In another example, part 301 may be performed by the pre-detector 101. If the pre-detector 101 performs part 301, the detection apparatus may not include the target event detector 103.

There are a plurality of manners for detecting the packet loss event. This is because a packet loss is determined in different manners at different layers in a network, the packet loss is also determined in different manners in different protocols, and the packet loss may also be determined by using different algorithms in a same protocol. For example, manners for determining the packet loss are different at a transport layer and a link layer. Using a TCP protocol at the transport layer as an example, a classic manner for determining the packet loss is using three repeated ACKs, to determine whether a packet loss occurs. A new algorithm—"recent acknowledgment (RACK) algorithm" uses a timestamp and an out-of-order window to determine whether a packet loss occurs.

In an example, part 301 may be independent of other steps. In other words, part 301 is still performed when the following other steps are performed.

Part 301 may be referred to as pre-detection. Correspondingly, a pre-detection result may include at least one of a quantity of paths on which the target event occurs and an identifier of the path on which the target event occurs.

In an example, "the quantity of the paths on which the target event occurs" may be "a quantity of paths on which the target event occurs within preset duration", and "the identifier of the path on which the target event occurs" may be "an identifier of the path on which the target event occurs within the preset duration".

Using the packet loss as an example, the pre-detection result may include at least one of a quantity of paths on which a packet loss occurs and an identifier of the path on which a packet loss occurs within the preset duration.

A person of ordinary skill in the art may flexibly design a length of the preset duration, for example, the preset duration may be designed as 10 round trip time (RTT) periods.

The RTT period is periodically updated. For example, the RTT period is updated once every 10 seconds. During updating, a weighted average value ($0.2 \times RTT\_i + 0.8 \times RTT\_j$) of value $RTT\_i$ (a value of an RTT measured in real time in a TCP) obtained through current measurement and value $RTT\_j$ obtained through previous measurement (previous 10 seconds) is taken as an updated RTT period.

In an embodiment, as mentioned above, after detecting the packet loss event, the target event detector 103 may send the pre-detection request to the pre-detector 101. Therefore, when receiving the pre-detection request for the first time, the pre-detector 101 may start a timer to perform countdown, and timing duration of the timer is the preset duration.

It can be noted that, if the pre-detector 101 receives the pre-detection request again, but the timer is started and does not time out, the timer is not reset again.

For example, the pre-detector 101 receives the pre-detection request (that is, detects a packet loss), and starts the timer, and the timing duration is 10 RTT periods. Within the 10 RTT periods, if the pre-detection request is received again (that is, a packet loss is detected again), the timer is not reset again.

In another example, the processor 280 in the detection apparatus may execute the program stored in the memory 220 to start the timer.

Optionally, after S301, S302 is further included: Separately calculate a sum of information entropies of a plurality of groups in a first set and a sum of an information entropy of a first group and information entropies of a plurality of second groups in a second set.

Entering part 302 part may be considered as entering a link detection phase.

In one example, the pre-detector 101 may determine whether the pre-detection result exceeds a preset quantity, and when the pre-detection result exceeds the preset quantity, instruct/start the link detector 102 to calculate the information entropy.

In another example, alternatively, the pre-detector 101 may send the pre-detection result to the link detector 102, and the link detector 102 determines whether the pre-detection result exceeds the preset quantity and calculates the information entropy when the pre-detection result exceeds the preset quantity.

However, when part 302 is performed, if the pre-detector 101 receives the pre-detection request again (that is, the packet loss event occurs again), the pre-detection request received again is discarded.

A person of ordinary skill in the art may flexibly design a length of the preset quantity, for example, the preset quantity may be designed as 1.

Using the packet loss event as an example, if a quantity of packet loss paths (that is, paths on which the packet loss event occurs) is 1 within 10 RTT periods, link detection is not performed. However, if the quantity of packet loss paths is 2 or more, part 302 is performed.

The first set and the second set are described below.

A plurality of paths separately belong to the plurality of groups in the first set. In addition, the plurality of paths also separately belong to the plurality of groups in the second set.

The second set includes one first group and at least one second group. The first group includes all paths on which the target event occurs (for example, the packet loss path in this embodiment), and compared with the plurality of groups in the first set, the second group does not have the paths on which the target event occurs.

In an embodiment, before the target event occurs, the paths separately belong to the plurality of groups in the first set, and each group includes at least one path.

It can be noted that the first set may be a set obtained after previous link detection.

Further, there may also be a case in which no link detection is performed. Actually, after a path is registered (path registration is described subsequently in this specification), the path is classified into an independent group. For example, path 1 to path 3 are registered, and path 1 to path 3 are classified into three independent groups. Each group includes one path. Therefore, even if link detection is not performed, the path also has a home group.

Correspondingly, after pre-detection ends (or the quantity of the paths on which the target event occurs exceeds the preset quantity), the plurality of paths separately belong to the plurality of groups in the second set.

A group to which a packet loss path belongs before the packet loss path is added to the first group may be referred to as "a group in which a packet loss event occurs". After pre-detection ends, "the group in which the packet loss event occurs" becomes the second group after the packet loss path is removed.

Figure 6:
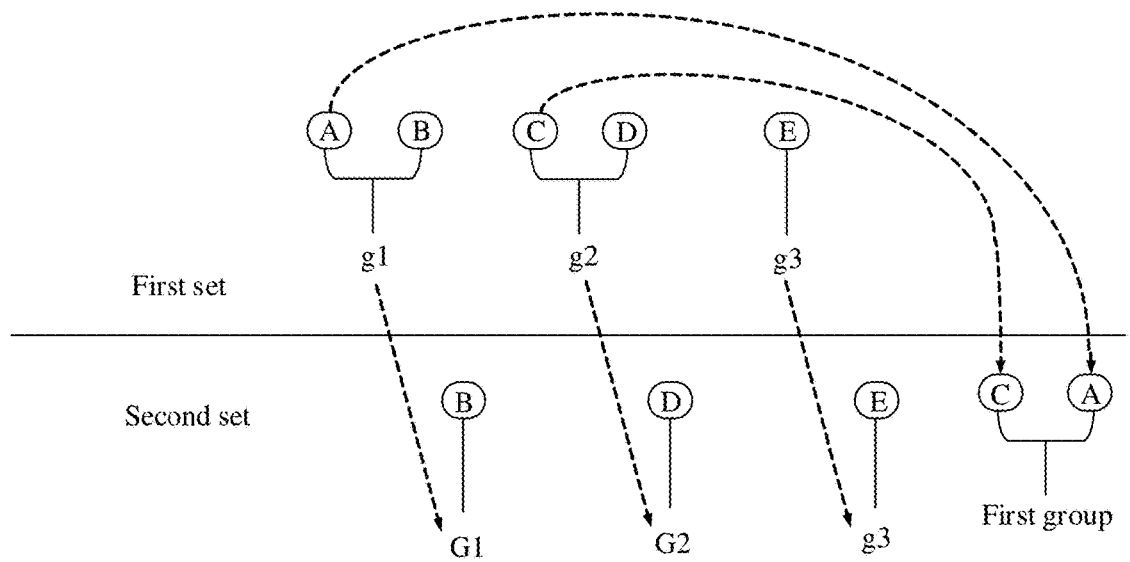
FIG. 6 is a schematic diagram of grouping according to an embodiment.

For example, referring to FIG. 6, there are path A to path E. Before a packet loss event occurs, path A and path B belong to group g1, path C and path D belong to group g2, and path E belongs to group g3.

Assuming that the packet loss event occurs on both path A and path C, path A is removed from group g1, path C is removed from group g2, and path A and path C are placed in the first group.

In this way, original group g1 becomes second group G1, and second group G1 includes path B. Original group g2 becomes second group G2, and second group G2 includes path D. The first group includes path A and path C. No packet loss occurs on a path in group g3.

Second group G1, second group G2, a new group, and group g3 form the second set. The second set is a set obtained by removing a packet loss path from an original group and adding the packet loss path to the first group.

It can be noted that different groups do not share a bottleneck link.

In an example, when a processor executes a program stored in a memory to implement the technical solution provided in an embodiment, a next operation to be performed needs to be determined based on a current state. To determine a current detection state, three states may be set: a normal transmission state (NORMAL), a pre-detection state (MPTCP_WAIT_LOSS), and a path grouping state (MPTCP_PROCESS).

After a system (detection device/detection apparatus) is initialized, the system enters the NORMAL state. When a packet loss event occurs, if the current state is the NORMAL state instead of the MPTCP_WAIT_LOSS state, the current state is transitioned from the NORMAL state to the MPTCP_ WAIT_LOSS state.

The three states correspond to three phases respectively. The NORMAL state corresponds to a phase before a target event (for example, a packet loss event) occurs, the MPTCP_ WAIT_LOSS state corresponds to a pre-detection phase, and the MPTCP_PROCESS state corresponds to a link detection phase. In different states, a same object is processed differently. For example, in the NORMAL state, after a packet loss event is detected, a timer may be started to perform countdown, and timing duration of the timer is the preset duration. However, in the MPTCP_WAIT_LOSS state, after a packet loss event is detected, the timer is no longer started.

S303. When the quantity of paths on which the target event occurs exceeds the preset quantity, compare the sum of the information entropies of the plurality of groups in the first set with the sum of the information entropy of the first group and the information entropies of the plurality of second groups in the second set.

In an example, step 303 may be performed by the link detector 102.

In addition, the link detector 102 may further send the first set, the second set, and a sum of information entropies corresponding to the two sets to the congestion controller 105.

The first set and the second set correspond to two grouping cases. An information entropy may be calculated to select the first set or the second set, so as to determine a case closer to a real situation.

How to calculate the information entropy is subsequently described in detail in this specification.

S304. When the sum of the information entropies of the plurality of groups in the first set is greater than the sum of the information entropy of the first group and the information entropies of the plurality of second groups in the second set, perform congestion control on the paths of the first group in a shared link congestion control manner.

Optionally, before congestion control is performed on the paths of the first group in the shared link congestion control manner, congestion control is performed on one or more paths in the first group in a single-path congestion control manner. In other words, after the sum of the information entropies of the plurality of groups in the first set is compared with the sum of the information entropy of the first group and the information entropies of the plurality of second groups in the second set, a congestion control manner of paths in the groups is changed based on a comparison result.

In another embodiment, still referring to FIG. 3, after S304, the link detection method may include the following steps.

S305. When the sum of the information entropies of the plurality of groups in the first set is less than the sum of the information entropy of the first group and the information entropies of the plurality of second groups in the second set, perform congestion control, in the shared link congestion control manner, on paths in a group that is in the first set and that includes two or more paths.

Optionally, before congestion control is performed, in the shared link congestion control manner, on the paths in the group that is in the first set and that includes two or more paths, congestion control is performed, in the single-path congestion control manner, on one or more paths in the group that is in the first set and that includes two or more paths. In other words, after the sum of the information entropies of the plurality of groups in the first set is compared with the sum of the information entropy of the first group and the information entropies of the plurality of second groups in the second set, a congestion control manner of paths in the groups is changed based on a comparison result.

In other words, in the first set and the second set, the one that has a smaller sum of information entropies is closer to a case in which paths actually share a bottleneck link. In this case, congestion control is performed on groups in the set that has the smaller sum of information entropies.

In an example, part 304 or part 305 may be performed by the congestion controller 105.

In another example, alternatively, the link detector 102 may directly send the set that has the smaller sum of information entropies to the congestion controller 105.

In an embodiment, the following congestion control may be performed.

(1) Congestion control is performed, in a first congestion control manner, on a group that includes a plurality of paths and that is in the set that has the smaller sum of information entropies.

As mentioned above, if a plurality of paths belonging to a same group share a bottleneck link, the first congestion control manner includes a congestion control manner for the paths sharing the bottleneck link, for example, the coupled congestion control manner mentioned above (which may also be referred to as a shared link congestion control manner).

(2) Congestion control is performed, in a second congestion control manner, on a group that includes one path and that is in the set that has the smaller sum of information entropies.

Because one path is included, and the path and another path do not share a bottleneck link, the second congestion control manner may be used, for example, the uncoupled congestion algorithm mentioned above (which may also be referred to as a non-shared link congestion control manner).

Congestion control manners of paths in different groups are independent of each other.

Figure 4B:
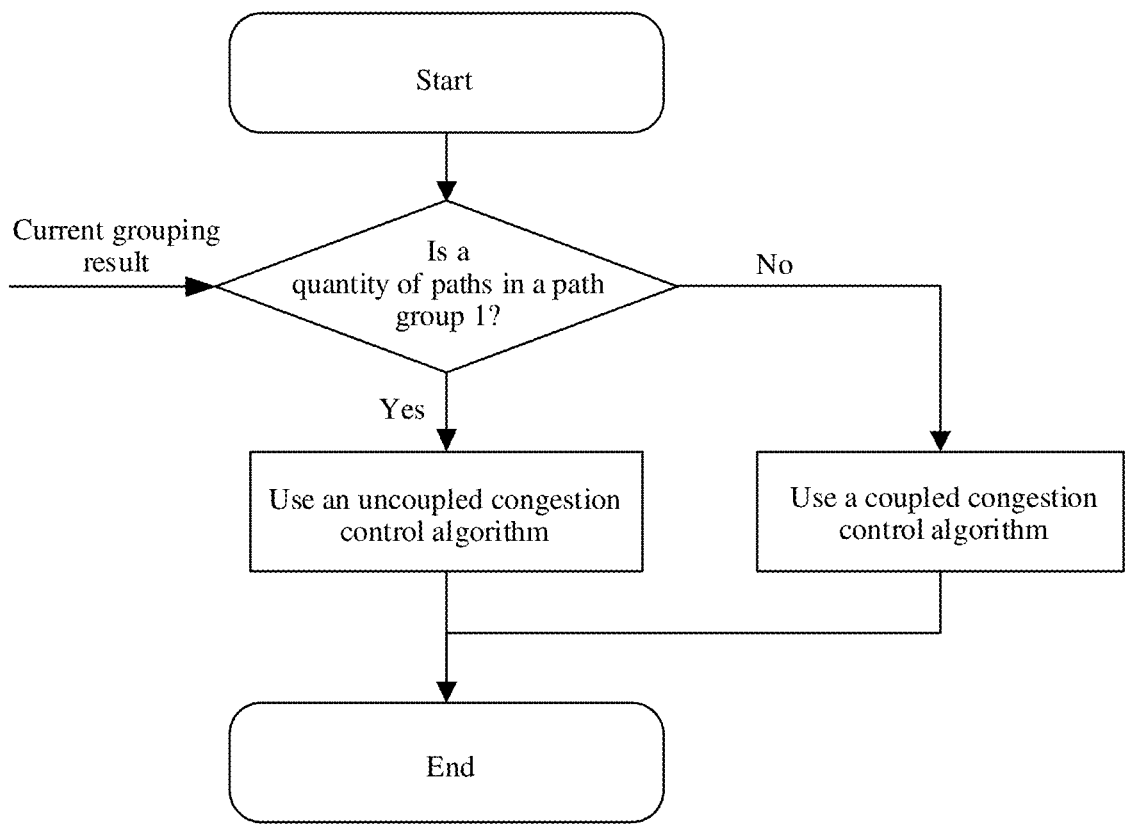
FIG. 4b is an example procedure of congestion control according to an embodiment.

For an exemplary congestion control procedure, refer to FIG. 4b.

Optionally, an economic factor may be further added to selection of a congestion control manner to further ensure fairness. For example, if a plurality of paths in a group access different network service providers, because the different service providers share a bottleneck link less likely, the second congestion control manner may also be selected for the paths in the group.

It can be noted that before the technical solution in embodiments of the invention is proposed, a packet loss event is usually used as a network congestion signal. In this embodiment, the packet loss event is used as a basis for determining bottleneck link sharing (instead of a congestion signal), thereby breaking the routine. This solution is more accurate than a conventional periodic detection solution, and reduces unnecessary detection overheads. In addition, system overheads are low, a convergence speed is fast, and no complex calculation is required (low calculation complexity).

In addition, in this embodiment, detection is performed at two layers. First-layer detection is pre-detection performed after a target event occurs (pre-detection includes detection of a quantity of packet loss paths within the preset duration). If it is determined (at least based on the quantity of packet loss paths) that further detection is required after pre-detection, shared bottleneck detection (namely, second-layer detection) is performed. This further reduces unnecessary calculation and detection overheads.

In conclusion, in this embodiment, a non-violent and non-random layer-based shared bottleneck detection manner is used. The packet loss event is used to drive shared bottleneck detection, so that the system overheads are low and the convergence speed is fast. Furthermore, the congestion control manner is adaptively selected for groups in a set that has a smaller sum of information entropies, thereby achieving both performance and fairness objectives.

Figure 5:
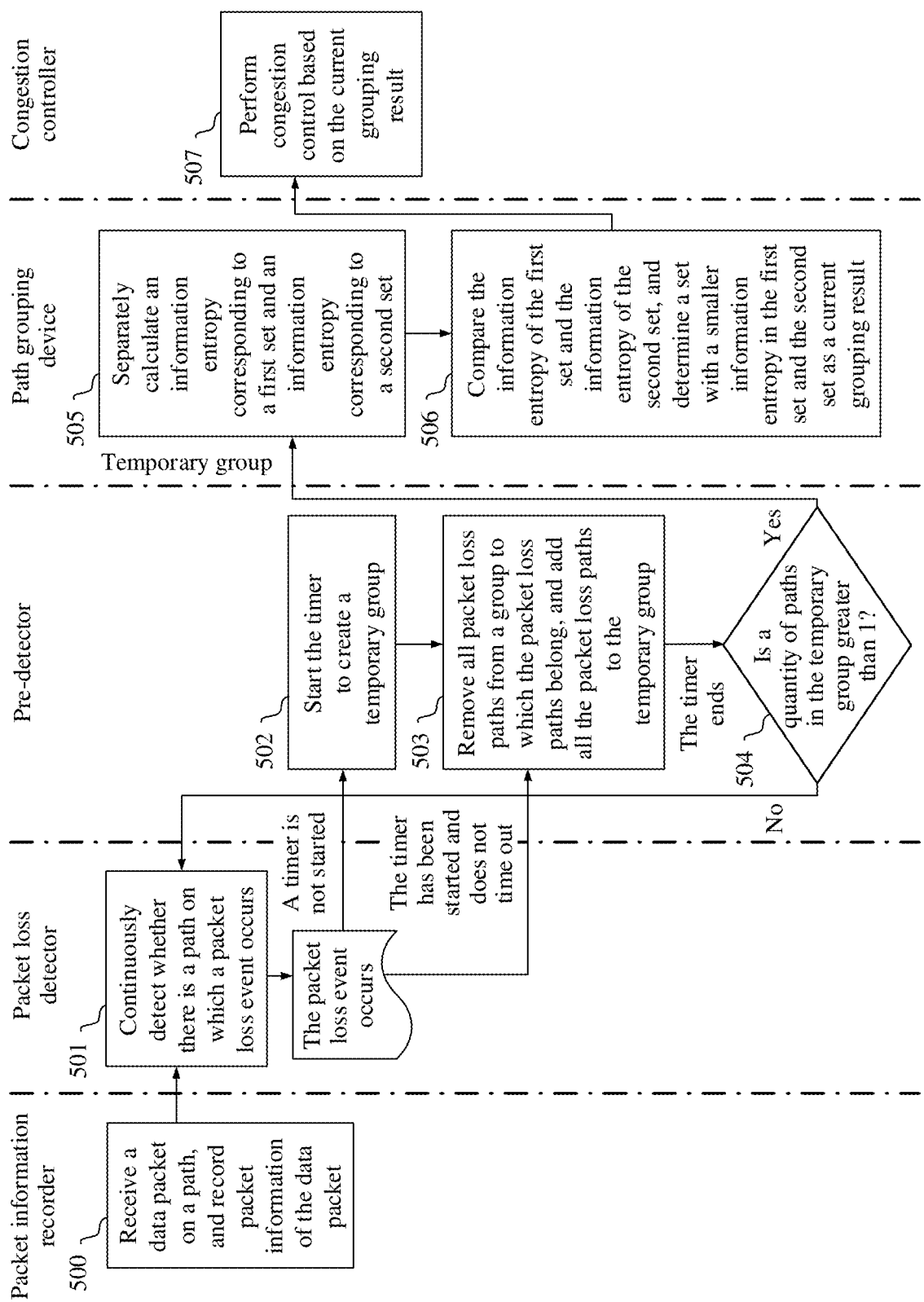
FIG. 5 is an example procedure of a link detection method according to an embodiment.

FIG. 5 shows another example interaction procedure of the foregoing detection method. The detection procedure may be applied to the foregoing mentioned scenario in which shared bottleneck link detection needs to be performed (for example, the scenario in which the MPTCP is used shown in FIG. 1b), and includes at least the following steps.

S500. A detection apparatus receives a data packet on a path, and records packet information of the data packet.

The packet information may include arrival time, and may further include path information, for example, a path identifier (Identifier, ID).

It can be noted that in the scenario shown in FIG. 1b, the host used as the transmit end includes the detection apparatus, and a data packet in the scenario may be an ACK (Acknowledgement) packet returned by the receive end.

However, in another embodiment of the present disclosure, in the scenario in which the host used as the receive end includes the detection apparatus, the data packet is not an ACK packet, but is a data packet that is sent by the transmit end and that carries data.

In one example, part 500 may be performed by the packet information recorder 104.

In addition, the detection apparatus may further include a collector, and the packet information recorder 104 may send the packet information to the collector, and the collector records the packet information.

The packet information recorder 104 may send corresponding packet information to collector after receiving a data packet, and may also send the packet information to collector periodically.

In an example, paths may be in a one-to-one correspondence with collectors. Therefore, n paths may correspond to n collectors, and each collector records packet information of a data packet received on a corresponding path.

In an embodiment, the collector may be a piece of memory space. Therefore, there is no network connection overhead between the packet information recorder 104 and the collector.

In another example, the data packet may be received by the RF circuit 210, and the collector may be memory space in a data storage area of the memory 220. Therefore, the processor 280 may execute a program stored in the memory 220, to send the packet information to a corresponding memory address in the data storage area of the memory 220.

It can be noted that part 500 is independent of other steps. In other words, part 500 is still performed (especially, data packet receiving) when other steps are performed.

S501. The detection apparatus continuously detects whether there is a path on which a packet loss event occurs.

For content of detecting the packet loss event, refer to the record of part 301. Details are not described herein again for the sake of brevity.

S502. In response to the packet loss event, if a timer is not started, the detection apparatus starts the timer, and creates a temporary group (namely, a first group).

Timing duration of the timer is the preset duration. For details, refer to part 301. Details are not described herein again for the sake of brevity. In addition, for how to start the timer, refer to part 301. Details are not described herein again for the sake of brevity.

S503. Within an effective time range of the timer, the detection apparatus removes all packet loss paths from a group to which the packet loss paths belong, and adds the packet loss paths to the temporary group.

In an example, part 503 may be performed by the pre-detector 101. In another example, the processor 280 may execute the program stored in the memory 220 to perform part 503.

For a related description of the packet loss path, refer to part 301. Details are not described herein again for the sake of brevity.

S504. The timer ends, and the detection apparatus determines whether a quantity of paths in the temporary group is greater than 1 (specified value); if yes, enters S505; otherwise, returns to S501 to wait for next pre-detection.

In an example, part 504 may be performed by the pre-detector 101. In another example, the processor 280 may execute the program stored in the memory 220 to perform part 504.

In addition, if there is more than one path in the temporary group, the pre-detection 101 may further send the temporary group to the link detector 102, and the link detector 102 performs a subsequent operation.

In another embodiment of the present disclosure, the timer may not be started, but the quantity of paths on which the packet loss event occurs is directly counted, and when the quantity of paths on which the packet loss event occurs is greater than the preset quantity, link detection is directly performed.

Optionally, S505. The detection apparatus separately calculates, based on packet information of all paths, an information entropy corresponding to a first set and an information entropy corresponding to a second set.

The information entropy corresponding to the first set is a sum of information entropies of a plurality of groups in the first set. The information entropy corresponding to the second set is a sum of information entropies of a plurality of groups in the second set.

In an example, part 505 may be performed by the link detector 102.

Calculating the sum of the information entropies of the plurality of groups in the first set may include: calculating an information entropy of each group in the first set based on the packet information of all the paths, and summing up the information entropy of each group to obtain the sum of the information entropies corresponding to the first set.

The foregoing example is still used. Assuming that the first set includes group g1, group g2, and group g3, information entropies of group g1, group g2, and group g3 are separately calculated, and then the information entropies of group g1, group g2 and group g3 are summed up, to obtain the sum of the information entropies corresponding to the first set.

Correspondingly, calculating the sum of the information entropies corresponding to the second set may include: calculating an information entropy of each group in the second set based on the packet information of all the paths, and summing up the information entropy of each group to obtain the information entropy corresponding to the second set.

The foregoing example is still used. Assuming that the second set includes second group G1, second group G2, the first group, and group g3, information entropies of second group G1, second group G2, the first group, and group g3 are separately calculated, and then the information entropies of second group G1, second group G2, the first group, and group g3 are summed up, to obtain the information entropy corresponding to the second set.

The information entropy is described below.

The information entropy is an average amount of information included in an event, a sample, or a feature in distribution or a data flow.

A random variable $X=\{x_1, \ldots, x_n\}$ is defined, p is a probability mass function of X, and X represents distribution of the information included in the event, the sample, or the feature.

Information entropy H(X) may be represented as:

$$H(X) = -\sum_i p(x_i)\log_2 p(x_i),$$

and subscript i indicates any number in 1-n.

As mentioned above, shared path detection may be performed based on an information entropy of an arrival time interval of a data packet, and an information entropy of an arrival time interval of any group (for example, group P, where group P may be the first group, the second group, or a group in the first set) may be calculated by using the following steps.

Step A): Sort data packets on all paths in group P by arrival time based on packet information of all the paths in group P, and calculate an arrival time interval between adjacent data packets.

The link detector 102 may obtain arrival time of data packets on each path of group P from the collector, sort the data packets on all the paths by arrival time, and calculate an arrival time interval between adjacent data packets.

For example, assuming that group P includes two paths: path A and path B, four data packets are received through path A, and six data packets are received through path B, the ten data packets are sorted by arrival time, and arrival time intervals between adjacent data packets are calculated.

Step B): Calculate time interval distribution of the data packets in group P based on the arrival time interval.

It can be noted that the time interval distribution herein is X, and each time interval distribution corresponds to a probability mass function p.

In an embodiment, a specific time interval may be used as a step length, and time interval distribution of all data packets in group P is calculated.

The step length may be set to 1 millisecond, or may be an average value of the arrival time intervals.

Step C): Calculate an information entropy of group P based on the time interval distribution.

For example, group P includes three data packets. It is assumed that the step length is 1 ms, and the three data packets have two arrival time intervals in total. It is assumed that the two arrival time intervals are 5 ms and 6 ms respectively. In this case, the arrival time interval distribution X of the data packets is $\{5, 6\}$, and a corresponding probability mass function is $p(x\_i)=½$ (because there is one 5 ms and one 6 ms, the probability mass function is ½), i=1, 2, i indicates $(i)^{th}$ distribution, and the information entropy $$H(X) = -\sum_i p(x_i)\log_2 p(x_i) = 1/2 + 1/2 = 1.$$

If the step length is 2 ms, arrival time interval distribution X corresponding to 5 ms and 6 ms is $\{2.5, 3\}$.

For another example, assuming that group P includes four data packets, the step length is still 1 ms, the four data packets have three arrival time intervals in total, and the three arrival time intervals are 5 ms, 6 ms, and 7 ms respectively. In this case, arrival time interval distribution X of the data packets is $\{5, 6, 7\}$, and a corresponding probability mass function is $p(x\_i)=⅓$, i=1, 2, 3, i indicates $(i)^{th}$ distribution, and the information entropy $$H(X) = -\sum_i p(x_i)\log_2 p(x_i) = -\frac{1}{3}\log_2\frac{1}{3} - \frac{1}{3}\log_2\frac{1}{3} - \frac{1}{3}\log_2\frac{1}{3} = \log_2 3.$$

For another example, assuming that group P includes four data packets, the step length is still 1 ms, the four data packets have three arrival time intervals in total, and the three arrival time intervals are 5 ms, 5 ms, and 7 ms respectively. In this case, arrival time interval distribution X of the data packets is {5, 6, 7}, a corresponding probability mass function is p(x_1)=⅔, p (x_2)=⅓, i=1, 2, and the information entropy is:

$$H(X) = -\sum_i p(x_i)\log_2 p(x_i) =$$

$$-\frac{2}{3}\log_2 \frac{2}{3} - \frac{1}{3}\log_2 \frac{1}{3} = \frac{2}{3}\log_2 \frac{3}{2} + \frac{1}{3}\log_2 3 = \log_2 3 - \frac{2}{3}.$$

In another example, the first group may be stored in a data storage area of the memory 220. The processor 280 may execute the program stored in the memory 220, and separately calculate, based on the packet information and the first group stored in the data storage area, the information entropy corresponding to the first set and the information entropy corresponding to the second set.

S506. The detection apparatus compares the information entropy of the first set and the information entropy of the second set, and determines a set with a smaller information entropy in the first set and the second set as a current grouping result.

In an example, part 506 may be performed by the link detector 102. In another example, the processor 280 may execute the program stored in the memory 220 to perform part 506.

The following describes a reason why the set with the smaller information entropy is selected as the current grouping result.

As mentioned above, a queuing phenomenon occurs on a bottleneck link. Due to existence of the queuing phenomenon, arrival time intervals of data packets are distributed more evenly.

In other words, using group g1 and second group G1 as an example, data packets received on paths in the two groups are separately sorted based on an arrival time sequence, and then arrival time intervals between adjacent data packets are calculated. If the arrival time intervals of second group G1 are distributed more evenly than that of group g1, it is considered that a plurality of paths in second group G1 more likely share a same bottleneck link.

Moreover, because the information entropy may indicate distribution convergence and divergence, if an information entropy of second group G1 is less than an information entropy of group g1, it may be considered that the plurality of paths in second group G1 more likely share the same bottleneck link.

Similarly, for the first set and the second set, a grouping case in a set with a smaller information entropy in the first set and the second set can be closer to a real situation in which paths share a same bottleneck link. Therefore, the set with the smaller information entropy is determined as the current grouping result.

S507. The detection apparatus performs congestion control based on the current grouping result.

For an exemplary congestion control manner, refer to parts 304 and 305. Details are not described herein again for the sake of brevity.

It can be seen that, in this embodiment, after the packet loss event occurs, all the packet loss paths are removed from the group, in the first set, to which the packet loss paths belong, and are added to the first group to obtain the second set. The second set includes at least the first group and the second group (in some cases, the second set may also include a group, in the first set, in which no packet loss event occurs). All of the first group, the second group, and the group in the first set include one or more paths. A plurality of paths belonging to a same group may share a same bottleneck link.

Therefore, in this embodiment, driven by the packet loss event, pre-screening (forming the first group) is performed on a group combination that may share a bottleneck link, instead of randomly combining paths in the existing solution. Using six data flows as an example, when a random combination manner is used, there are up to 64 cases required for traversal detection. However, in this embodiment, pre-screening is performed, and it is no longer necessary to traverse and detect a plurality of grouping combinations, thereby greatly reducing traversal time, and further improving detection real-time performance and practicability.

Moreover, the congestion control manner is adaptively selected based on the current grouping result of shared path bottleneck detection, thereby achieving both performance and fairness objectives.

In another embodiment, after a temporary group is obtained, whether paths in the temporary group share a bottleneck link may be directly determined. If the paths in the temporary group share a bottleneck link, the second set is determined as a current grouping result, or if the paths in the temporary group do not share a bottleneck link, the first set is determined as a current grouping result.

In an embodiment, whether the paths in the temporary group share a bottleneck link may be detected based on one way delay (OWD) distribution, which may include the following steps:

Step 1: For a path in the temporary group, calculate one way delay for a data packet received on the path.

Step 2: Perform denoising processing.

Step 3: Determine, by using time domain and frequency domain statistics, which paths in the temporary group share a same bottleneck link with the path.

If there is a path that does not share the same bottleneck link with the path and that is in the temporary group, it is determined that the paths in the temporary group do not share a bottleneck link. Otherwise, it is determined that the paths in the temporary group share a bottleneck link.

Also, based on the foregoing analysis, the paths that share a bottleneck link in the temporary group may be classified into one group, to re-divide the temporary group into one or more groups.

A group obtained through re-division and another group in the second set form a third set, and the third set may be used as a current grouping result.

For example, the second set includes second group G1, second group G2, the temporary group, and group g3. The temporary group includes paths a, path c, path d, and path e. Based on an OWD analysis, path a and path c share a bottleneck link, and path d and path e share a bottleneck link. Then, the temporary group is re-divided into group G3 (including path a and path c) and group G4 (including path d and path e). In this way, the third set including second group G1, second group G2, first group g3, group G3, and group G4 is used as the current grouping result.

In addition, there is another special case, that is, all the paths in the temporary group have same source IP addresses and destination IP addresses. In this case, it may be directly determined that all the paths in the temporary group share a bottleneck link.

The following describes the technical solution in detail by using a scenario of a server and a client that support an MPTCP as an example.

Figure 7A:
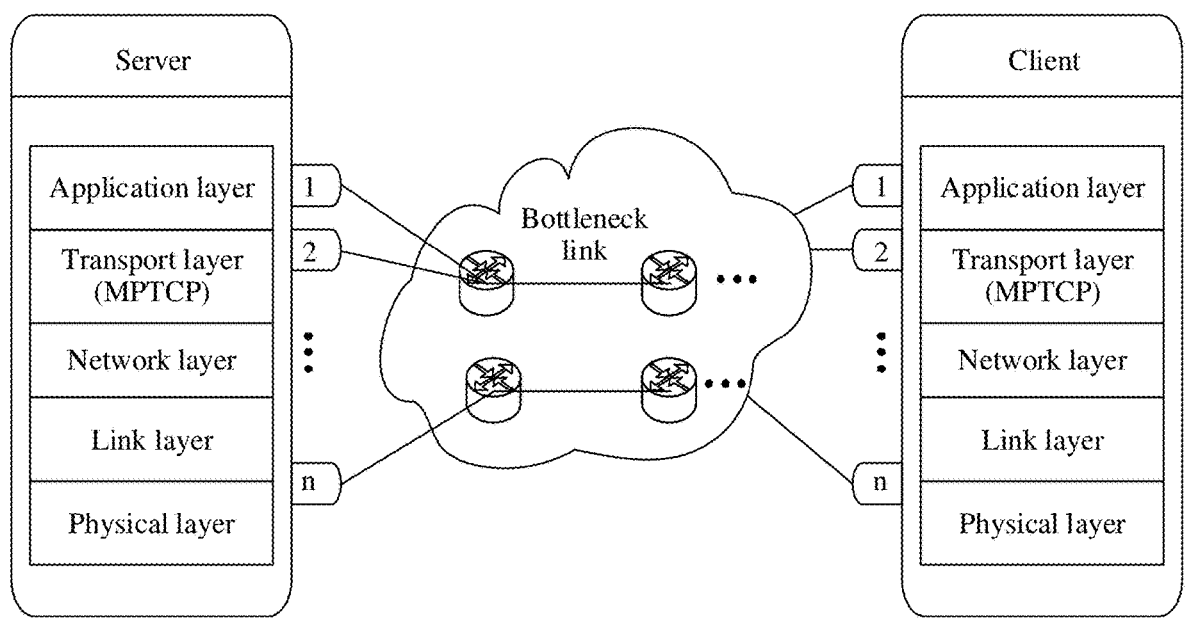
FIG. 7a is example diagrams of a communication scenario between a server and a client that support an MPTCP according to an embodiment.
Figure 7B:
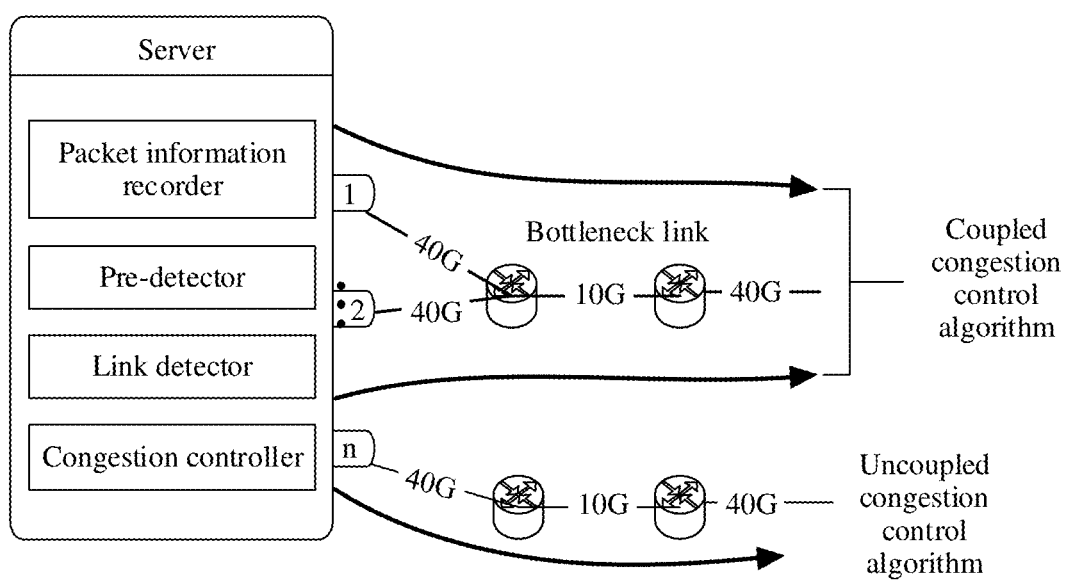
FIG. 7b is an example diagram of a communication scenario between a server and a client that support an MPTCP according to an embodiment.

FIG. 7a and FIG. 7b show a communication scenario between a server and a client that support an MPTCP. In this scenario, an MPTCP connection is established between the server and the client. The server performs layer-based shared bottleneck link detection driven by a packet loss on all subflows in the MPTCP connection, to obtain a detection result. Then, a congestion controller in the server selects a congestion control manner based on the detection result, to implement high performance and ensure fairness.

In addition, the foregoing describes three available states: a normal transmission state (NORMAL), a pre-detection state (MPTCP_WAIT_LOSS), and a path grouping state (MPTCP_PROCESS).

Figure 8A:
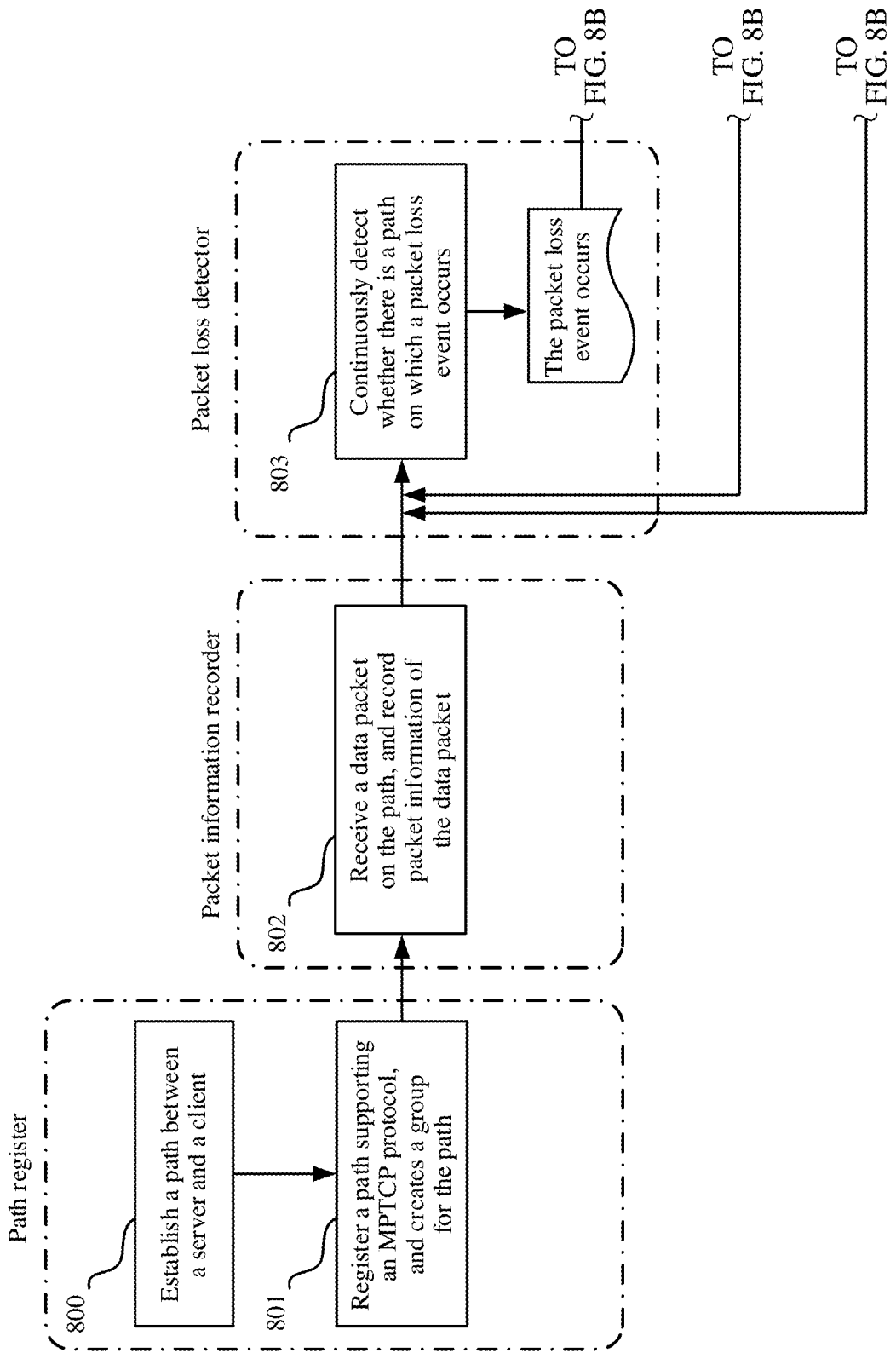
FIG. 8a is an example procedure of a link detection method according to an embodiment.
Figure 8B:
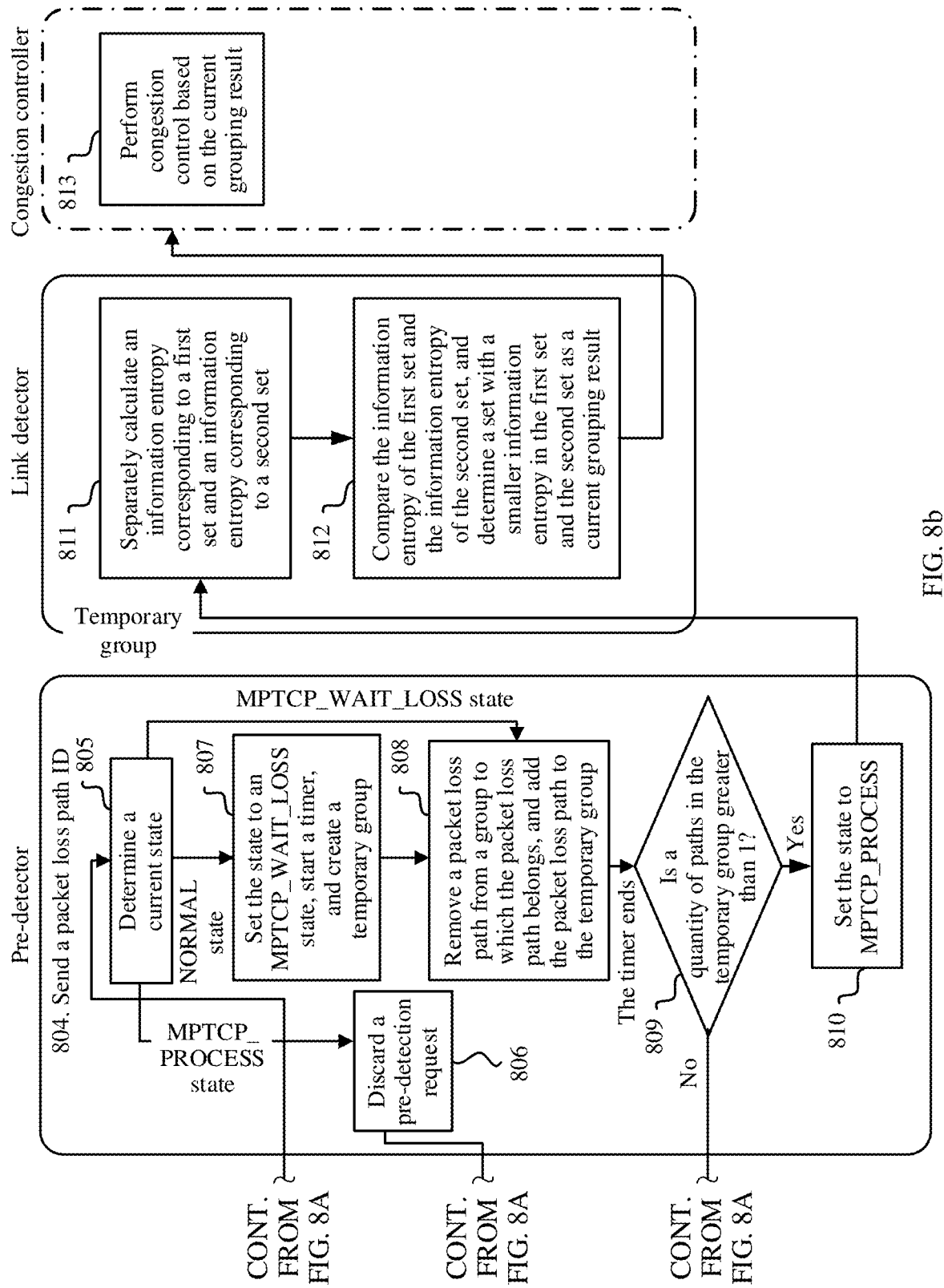
FIG. 8b is an example procedure of a link detection method according to an embodiment.

Based on the three states, the following describes an example procedure in the scenario of the server and the client that support the MPTCP. Referring to FIG. 8a and FIG. 8b, the procedure may include at least the following steps.

S800. Establish a path between the server and the client.

In an embodiment, connection establishment is completed on each path of the MPTCP by a TCP three-way handshake. When the client initiates a connection request to the server, the client sends an SYN (synchronous) request to the server.

After receiving the SYN request, the server returns an SYN ACK packet, and then the client sends an ACK packet. In this case, one transmission path is successfully established. A data flow transmitted on the path is referred to as a subflow of the MPTCP.

In an example, part 800 may be performed by the path register (the path register is also a newly added unit) of the detection apparatus.

In another example, the processor 280 in the detection device may execute the program stored in the memory 220, and invoke the RF circuit 210 to exchange data with the client to establish a path.

S801. The server registers a path supporting the MPTCP protocol, and creates a group for the path.

After successfully establishing one transmission path, the server first determines whether the path supports the MPTCP protocol. If the path does not support the MPTCP protocol, data transmission is directly performed in an uncoupled congestion control manner (for example, CUBIC or Reno). If the path supports the MPTCP protocol, the path is registered in the path register, where registration content includes a four-tuple: a source IP address and a source port, and a destination IP address and a destination port. The four-tuple may be used as a path ID of the path.

In addition, the path register requests a piece of memory space (collector) from a system, to record packet information of an ACK packet subsequently transmitted on the registered path. The packet information may include arrival time of the data packet, and may further include path information (for example, a path ID).

Then, the path register creates a group, and adds the registered path to the group.

It can be noted that, it is considered by default that a newly established path is in an independent group. This is because paths that belong to a same group share a bottleneck link, but shared bottleneck link detection is not performed on the newly established path and it cannot be determined that the newly established path shares a bottleneck link with which path. Therefore, one group is created separately, and the group includes the newly established path.

After the path is established, data may be transmitted between the server and the client.

In a subsequent transmission process, if there is a new path that can be used for transmission, a connection is established to the new path in the MPTCP by using a three-way handshake process. Parts 800 and 801 are performed each time a new transmission path is established.

In an example, the processor 280 in the detection apparatus may execute the program stored in the memory 220 to perform part 801.

S802. A packet information recorder in the server receives a data packet on the path, and records packet information of the data packet.

In this embodiment, the server records packet information of an ACK packet.

When the packet information of the ACK packet is recorded, whether a path for transmitting the ACK packet has been registered in the path register needs to be determined first. If the path has been registered, the packet information of the ACK packet is recorded in the collector. Otherwise, the path is first registered in the path register, and then the packet information of the ACK of the path is recorded in the collector.

It can be noted that, if a path does not support the MPTCP, the path register does not register the path. However, as the network dynamically changes, the path may support the MPTCP. Therefore, a case in which the path has not been registered when the ACK packet is received may occur. In this case, the path register performs path registration on the path, and then the packet information recorder records the packet information.

Part 802 is similar to part 500. Details are not described herein again for the sake of brevity.

S803. A target event detector in the server continuously detects whether there is a path on which a packet loss event occurs.

Part 803 is the same as part 501. Details are not described herein again for the sake of brevity.

S804. After detecting that a packet loss event occurs, the target event detector in the server sends an ID of a packet loss path to a pre-detector.

In addition, the target event detector may further send a pre-detection request to the pre-detector.

Alternatively, the ID of the packet loss path may be carried in the pre-detection request and sent to the pre-detector.

S805. The pre-detector in the server determines a current state, and if the current state is NORMAL, enters S807, if the current state is MPTCP_WAIT_LOSS, enters S808, or if the current state is MPTCP_PROCESS, enters S806.

S806. The pre-detector discards the pre-detection request, and returns to S803.

If the current state is MPTCP_PROCESS state, it indicates that link detection is being performed. In this case, the pre-detector discards the pre-detection request, and returns to S803.

S807. The pre-detector sets the state to the MPTCP_WAIT_LOSS state (that is, enters pre-detection), starts a timer, creates a temporary group (TEMP_GRP), and enters S808.

Figure 9A:
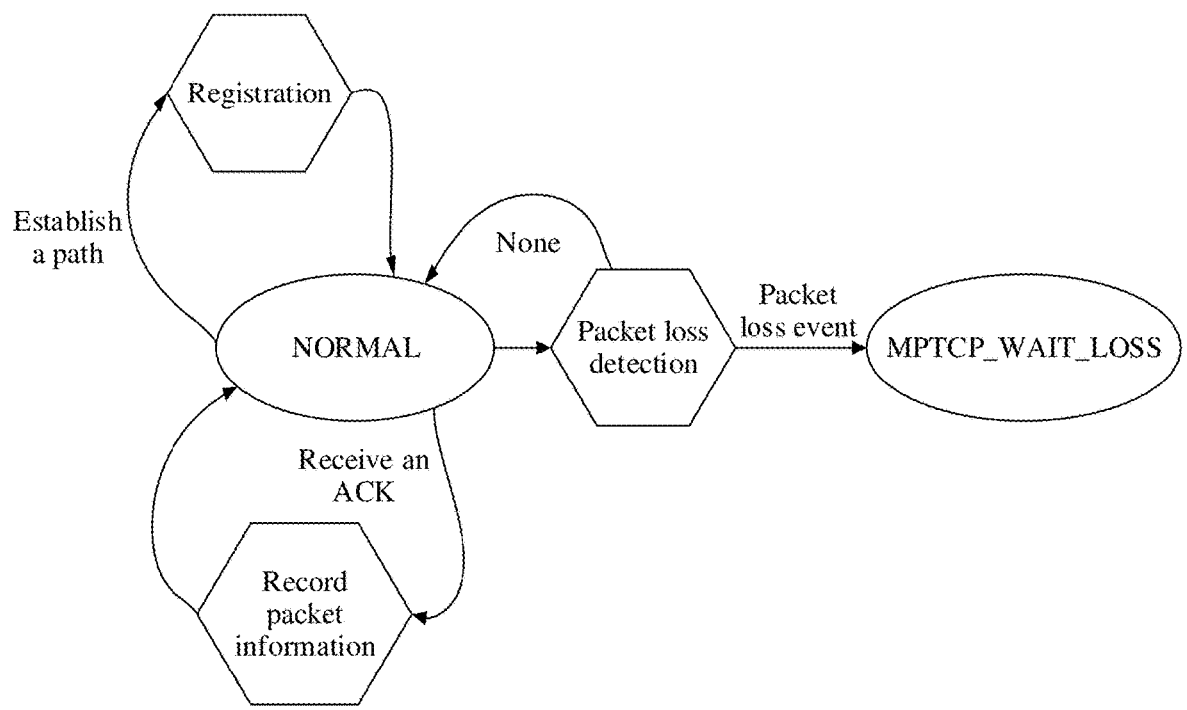
FIG. 9a is a schematic diagram of state transition according to an embodiment.

For state transition from NORMAL to MPTCP_WAIT_LOSS, refer to FIG. 9a.

The temporary group is the first group.

For a related description of the timer, refer to part 301. Details are not described herein again for the sake of brevity.

After the MPTCP_WAIT_LOSS state is entered, as long as the timer does not time out, the MPTCP_WAIT_LOSS state is kept.

S808. The pre-detector removes the packet loss path from a group to which the packet loss path belongs, and adds the packet loss path to the temporary group.

In an embodiment, to reduce a CPU dissipation caused by adding a path/deleting a group, whether a path belongs to a group may be marked in a flagging manner.

In an example, an ownership of a path may be marked with a first state identifier (for example, DISABLE) and a second state identifier (for example, ENABLE). The first state identifier may represent "not belonging to" or "temporarily unavailable", and the second state identifier may represent "belonging to" or "available".

For example, assuming that path a belongs to group g1, and a packet loss occurs within a valid timing range of the timer, an ID of path a is added to the temporary group, a state of path a in the temporary group is set to ENABLE, and a state of path a in group g1 is set to DISABLE.

Figure 10:
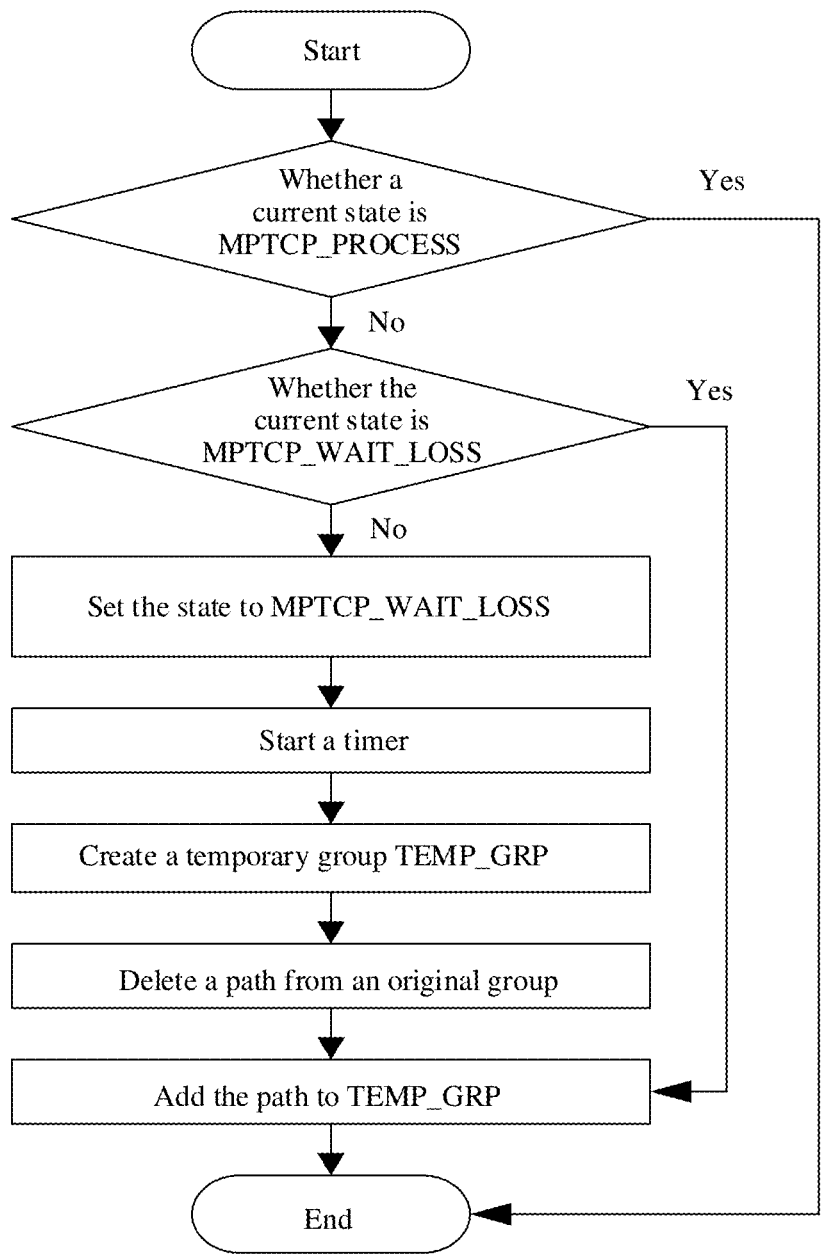
FIG. 10 is an example flowchart of adding a packet loss path to a temporary group (TEMP_GRP) according to an embodiment.

For a procedure of adding the packet loss path to TEMP_GRP in a pre-detection process, refer to FIG. 10.

S809. The timer ends, and the pre-detector of the server determines whether a quantity of paths in the temporary group is greater than 1 (specified value); if yes, enters S810 (set the state to MPTCP_PROCESS); otherwise, returns to S803 to wait for next pre-detection.

For a related description, refer to part 503 and part 504. Details are not described herein again for the sake of brevity.

S810. Set the state to MPTCP_PROCESS, and send TEMP_GRP to a link detector.

It can be noted that, it can be learned with reference to S809 that, after the timer times out, if there is one path in the temporary group, the system returns to the NORMAL state. Before the NORMAL state is resumed, a state corresponding to the path in TEMP_GRP may be set to DISABLE, and a state corresponding to the path in the group is resumed to ENABLE.

The foregoing example is still used. Assuming that path a originally belongs to group g1, and a packet loss occurs on path a within the valid timing range of the timer, an ID of path a is added to the temporary group, a state of path a in the temporary group is set to ENABLE, and a state of path a in group g1 is set to DISABLE.

If there is path a in the temporary group after the timer times out, the state of path a in the temporary group is set to DISABLE, and the state of path a in group g1 is resumed to ENABLE.

If the temporary group includes more than one path, the system enters the MPTCP_PROCESS state to perform link detection.

Figure 9B:
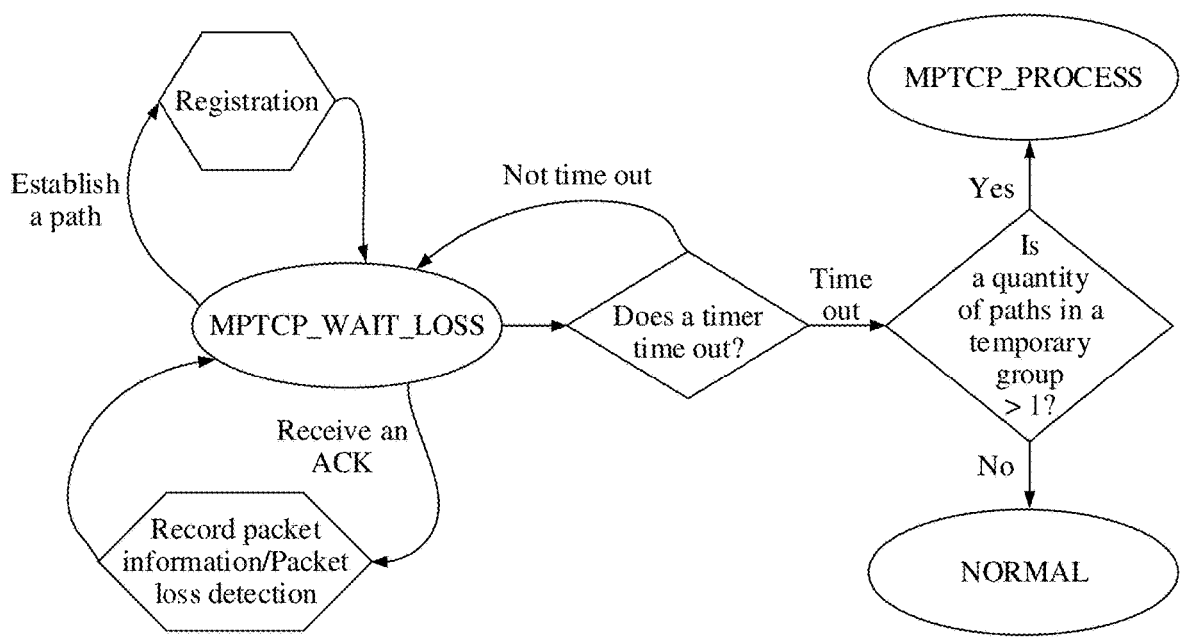
FIG. 9b is a schematic diagram of state transition according to an embodiment.

For transition from NORMAL to another state, refer to FIG. 9b.

After the timer ends, there is a second set. The second set may include at least the temporary group and a second group, and may further include a group in which no packet loss occurs in a first set.

Optionally, S811. The link detector of the server separately calculates an information entropy corresponding to the first set and an information entropy corresponding to the second set.

In an embodiment, after receiving TEMP_GRP (in an embodiment, it is assumed that all paths in TEMP_GRP share a same bottleneck link), the link detector requests packet information of all the paths from the packet information recorder, and calculates the information entropy of the first set (which may be referred to as last_entropy) and the information entropy of the second set based on the packet information.

It can be noted that, if shared path bottleneck detection is performed for the first time, last_entropy may be infinite by default.

S812. The link detector compares the information entropy of the first set and the information entropy of the second set, and determines a set with a smaller information entropy in the first set and the second set as a current grouping result.

In an embodiment, if the information entropy of the second set is smaller than last_entropy, the temporary group is stored, and the temporary group is added to a formal path group set. Then, each path in the temporary group is deleted from the first group.

If the first group becomes an empty group after paths are deleted, the empty group is also deleted, a value of last_entropy is updated to a value of the information entropy of the second set, and finally, the transmission state is resumed to normal (NORMAL).

If the information entropy of the second set is larger than last_entropy, the temporary group is abandoned, the state of the packet loss path in the first group is set to ENABLE, and space of TEMP_GRP is released.

Figure 9C:
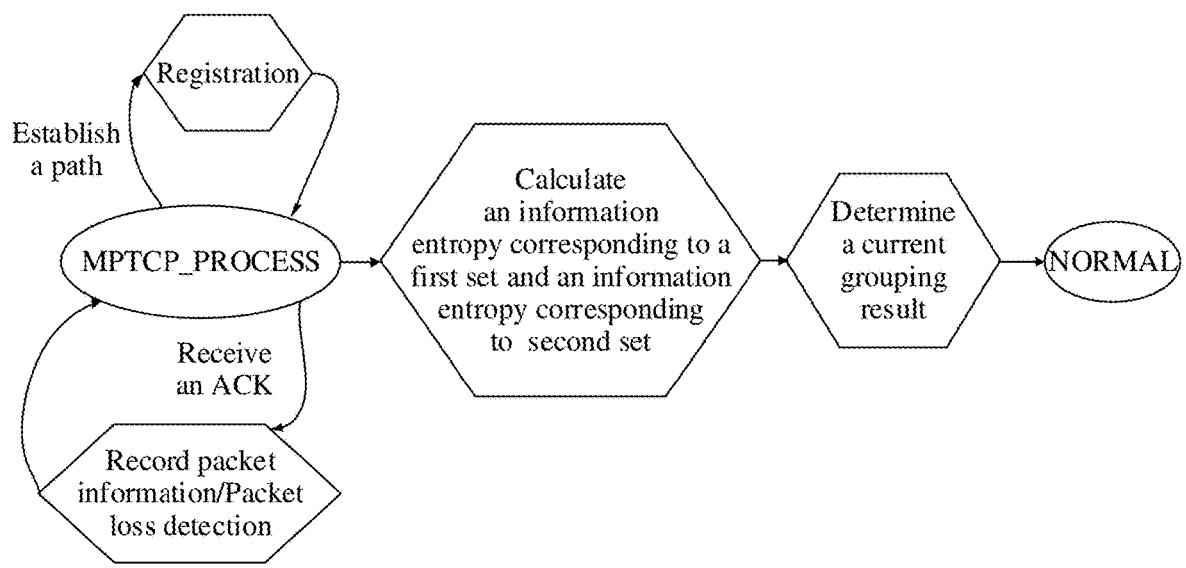
FIG. 9c is a schematic diagram of state transition according to an embodiment.

For transition from the MPTCP_PROCESS state to the NORMAL state, refer to FIG. 9c.

Figure 9D:
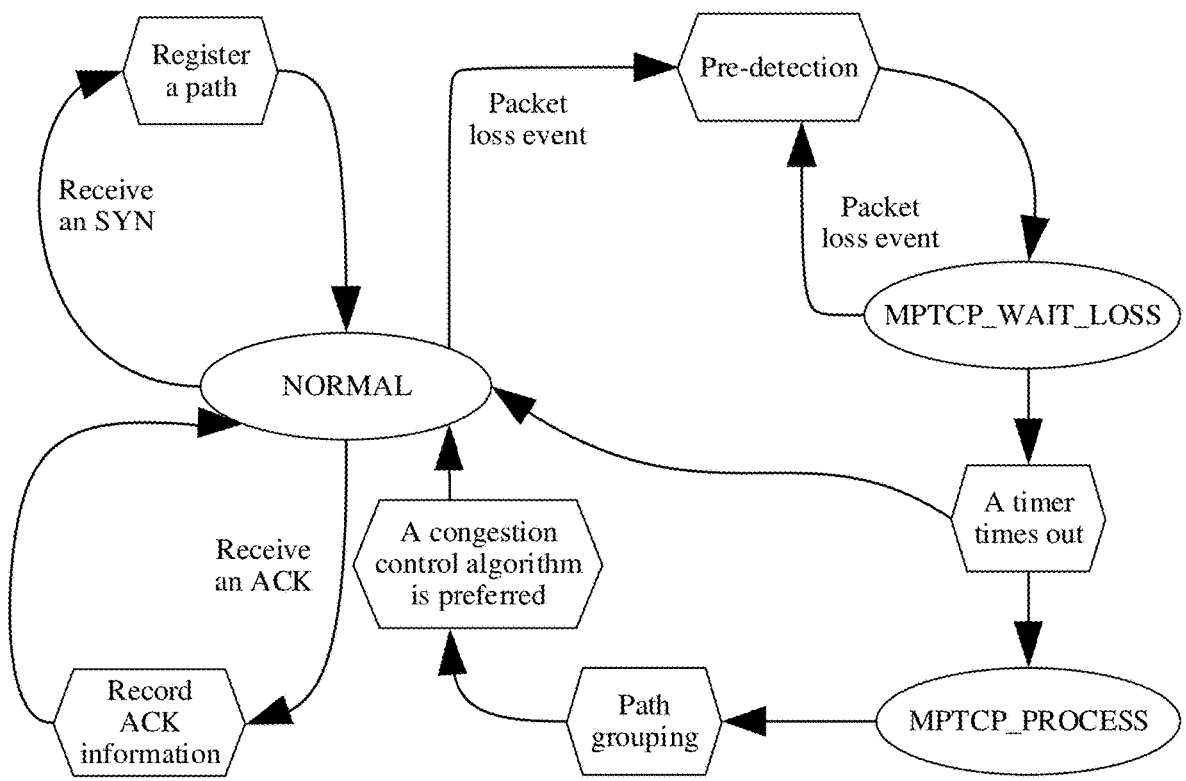
FIG. 9d is a schematic diagram of state transition according to an embodiment.

For a global example of transition between the three states, refer to FIG. 9d.

S813. A congestion controller of the server performs congestion control based on the current grouping result.

A main function of the congestion controller is to select a congestion control manner. To ensure both fairness for a conventional TCP and high performance of the MPTCP, in an embodiment, the congestion control manner is allocated based on a grouping result indicating whether paths share a bottleneck link.

Part 813 is similar to part 303 and part 507. Details are not described herein again for the sake of brevity.

After part 812 or part 813, the network state may be set to NORMAL.

In an example, the processor 280 in the detection device may execute the program stored in the memory 220 to perform parts 804-813.

It can be seen that, this embodiment provides a layer-based detection mechanism driven by a packet loss event, to reduce system overheads, and the layer-based detection mechanism may increase a convergence speed and ensure real-time performance.

In addition, in this embodiment, the coupled congestion control manner and the uncoupled congestion control manner may be adaptively selected based on a detection result of shared bottleneck detection. If paths share a bottleneck link, in consideration of a fairness constraint, an optimal path is selected for transmission from the paths that share a same bottleneck link. If the paths do not share a bottleneck link, subflows run in respective congestion control manners, which do not affect each other. While MPTCP performance is ensured, a throughput of the MPTCP is increased, and strict fairness is ensured. In a scenario in which the network state changes dynamically and a plurality of network access modes are mixed, adaptability of the MPTCP protocol is improved.

In another embodiment, before the information entropy of the first set and the information entropy of the second set are separately calculated, whether all the paths in the temporary group have same source IP addresses and destination IP addresses may be further determined. If yes, the second set is directly used as a current result, and no information entropy is calculated. If no, the step of "calculating the information entropy corresponding to the first set and the information entropy corresponding to the second set separately" is entered.

Using the embodiment shown in FIG. 8a and FIG. 8b as an example, before step 810 is performed, the following design may be produced.

Whether all the paths in the temporary group have the same source IP addresses and destination IP addresses is determined, and if yes, the second set is directly determined as the current grouping result, and then the transmission state is resumed to the normal transmission state (NORMAL).

The foregoing example is still used. Assuming that path a originally belongs to group g1, and a packet loss occurs on path a within the valid timing range of the timer, the ID of path a is added to the temporary group, the state of path a in the temporary group is set to ENABLE, and the state of path a in group g1 is set to DISABLE.

After the timer times out, it is assumed that the temporary group includes path a and path b.

If all the paths in the temporary group have the same source IP addresses and destination IP addresses, the temporary group is stored, and then path a in group g1 is deleted.

If the plurality of paths in the temporary group have different source IP addresses and destination IP addresses, TEMP_GRP may be transmitted to the link detector, the state is set to MPTCP_PROCESS, and an operation of calculating the information entropy is subsequently performed.

Figure 11:
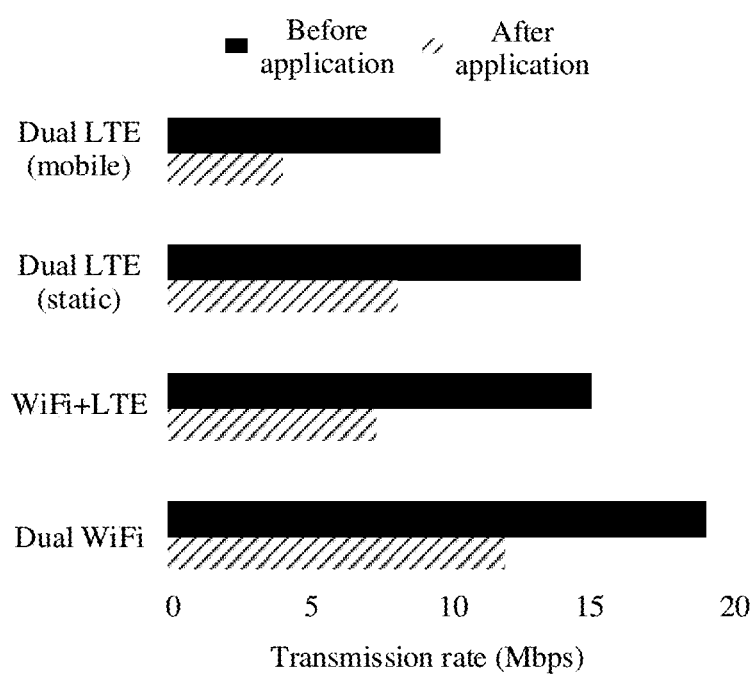
FIG. 11 is a diagram of an experiment result of throughput improvement according to an embodiment.

Referring to FIG. 11, experimental results in four exemplary different scenarios indicate that an increase in a throughput of the MPTCP by using the technical solution provided in an embodiment may reach more than 60%. "Dual LTE (mobile)" indicates that both MPTCP dual paths are accessed through a long term evolution (LTE) system, and a test terminal moves at a high speed of 300 kilometers per hour. "Dual LTE (static)" indicates that both MPTCP dual paths are accessed through LTE, and a test terminal is in a static environment. "WiFi+LTE" indicates that MPTCP dual paths are separately accessed through WiFi and LTE, and "dual WiFi" indicates that both MPTCP dual paths are accessed through WiFi.

Therefore, the technical solution provided in this embodiment is especially applicable to an application having a high throughput requirement, such as video streaming media and large file transfer services, and performance and fairness characteristics of the technical solution can improve benefits of both an operator and a user. In an embodiment, fairness is maintained to help the operator maximize network utility. Increasing the throughput brings ultimate quality of service and user experience.

It can be noted that the foregoing detection solution may be further used for a design of a traffic management policy that requires shared bottleneck link detection, for example, inter-cloud traffic management. A detection result indicating whether data flows share a bottleneck may be used as a basis for the management policy, to achieve a finer traffic engineering target, for example, congestion control, traffic control, and load balancing.

In an embodiment, in a traffic management design, an execution body may be a routing switch node using a flow as a scheduling unit. First, the routing switch node may perform layer-based detection on a plurality of flows based on a trigger packet loss event, to classify flows that share a same bottleneck link into a same group, traffic management is performed on a per-group basis, and traffic management policies of groups are independent of each other. When a group has one flow, resource allocation of the flow is not affected by another flow, and when there are more than one flow in the group, flows in the same group contend with each other. Therefore, a traffic management policy may be used as required, to allocate a corresponding resource to each flow.

Optionally, the traffic management policy may use a principle of maximum-minimum fairness, and a bandwidth is allocated based on a service level agreement (SLA) of each flow. Alternatively, the bandwidth of each flow may be directly and evenly allocated.

Methods or algorithm steps described with reference to content disclosed in an embodiment may be implemented by hardware, or may be implemented by a processor executing a software instruction. The software instruction may include a corresponding software module. The software module may be stored in a random access memory (RAM), a flash memory, a read-only memory (ROM), an erasable programmable read only memory (EPROM), a register, a hard disk, a removable hard disk, a compact disc read-only memory (CD-ROM), or a storage medium of any other form well known in the art. For example, a storage medium is coupled to a processor, so that the processor can read information from the storage medium and can write the information into the storage medium. The storage medium may alternatively be a component of the processor. The processor and the storage medium may be located in an application specific integrated circuit (ASIC). In addition, the ASIC may be located in user equipment. The processor and the storage medium may exist in the user equipment as discrete components.

A person of ordinary skill in the art can be aware that in the foregoing one or more examples, functions described in an embodiment may be implemented by hardware, software, firmware, or any combination thereof. When these functions are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium that can be accessed by a general-purpose computer or a dedicated computer.

The objectives, technical solutions, and benefits are further described in detail in the foregoing exemplary embodiments. It should be understood that the foregoing descriptions are merely embodiments, but are not intended to limit the protection scope of this application. Any modification, equivalent replacement or improvement made based on technical solutions of this application shall fall within the protection scope of this application.

What is claimed is:

1. A link detection method, comprising:
when a target event occurs on paths, in a plurality of paths, whose quantity exceeds a preset quantity, comparing a sum of information entropies of a plurality of groups in a first set with a sum of an information entropy of the first group and information entropies of a plurality of second groups in a second set, wherein the plurality of paths separately belong to the plurality of groups in the first set, the plurality of paths also separately belong to the plurality of groups in the second set, the second set comprises the one first group and the plurality of second groups, the first group comprises all the paths on which the target event occurs, and compared with the plurality of groups in the first set, the plurality of second groups in the second set do not have the paths on which the target event occurs; and when the sum of the information entropies of the plurality of groups in the first set is greater than the sum of the information entropy of the first group and the information entropies of the plurality of second groups in the second set, performing congestion control on the paths of the first group in a shared link congestion control manner.

2. The method according to claim 1, wherein before the comparing the sum of the information entropies of the plurality of the groups in the first set with the sum of the information entropy of the first group and the information entropies of the plurality of the second groups in the second set, the method further comprises:

detecting the quantity of the paths on which the target event occurs, wherein the preset quantity is two or more.

3. The method according to claim 1, wherein before the performing of the congestion control on the paths of the first group in the shared link congestion control manner, the method comprises:

performing the congestion control on one or more paths in the first group in a single-path congestion control manner.

4. A link detection method, comprising:

when a target event occurs on paths, in a plurality of paths, whose quantity exceeds a preset quantity, comparing a sum of information entropies of a plurality of groups in a first set with a sum of an information entropy of a first group and information entropies of a plurality of second groups in a second set, wherein the plurality of paths separately belong to the plurality of groups in the first set, the plurality of paths also separately belong to the plurality of groups in the second set, the second set comprises the one first group and the plurality of second groups, the first group comprises all the paths on which the target event occurs, and compared with the plurality of groups in the first set, the plurality of second groups in the second set do not have the paths on which the target event occurs; and when the sum of the information entropies of the plurality of groups in the first set is less than the sum of the information entropy of the first group and the information entropies of the plurality of second groups in the second set, performing congestion control, in a shared link congestion control manner, on paths in one group of the plurality of groups in the first set and that comprises two or more paths.

5. The method according to claim 4, wherein before the comparing the sum of the information entropies of the plurality of groups in the first set with the sum of the information entropy of the first group and the information entropies of the plurality of the second groups in the second set, the method further comprises:

detecting the quantity of the paths on which the target event occurs, wherein the preset quantity is two or more.

6. The method according to claim 4, wherein before the performing of the congestion control, in the shared link congestion control manner, on paths in one group of the plurality of groups in the first set and that comprises two or more paths, the method comprises:

performing the congestion control, in a single-path congestion control manner, on one or more paths in the group of the plurality of groups in the first set and that comprises two or more paths.

7. A computer non-transitory storage medium, wherein the computer non-transitory storage medium stores an instruction, and the instruction is loaded by a processor to perform:

when a target event occurs on paths, in a plurality of paths, whose quantity exceeds a preset quantity, comparing a sum of information entropies of a plurality of groups in a first set with a sum of an information entropy of the first group and information entropies of a plurality of second groups in a second set, wherein the plurality of paths separately belong to the plurality of groups in the first set, the plurality of paths also separately belong to the plurality of groups in the second set, the second set comprises the one first group and the plurality of second groups, the first group comprises all the paths on which the target event occurs, and compared with the plurality of groups in the first set, the plurality of second groups in the second set do not have the paths on which the target event occurs; and when the sum of the information entropies of the plurality of groups in the first set is greater than the sum of the information entropy of the first group and the information entropies of the plurality of second groups in the second set, performing congestion control on the paths of the first group in a shared link congestion control manner.

8. The computer non-transitory storage medium according to claim 7, wherein the instruction is loaded by the processor to further perform:

detecting the quantity of the paths on which the target event occurs, wherein the preset quantity is two or more.

9. The computer non-transitory storage medium according to claim 7, wherein the instruction is loaded by the processor to further perform:

performing the congestion control on one or more paths in the first group in a single-path congestion control manner.

* * * * *